United States Patent
Cormier et al.

(10) Patent No.: US 11,951,475 B2
(45) Date of Patent: Apr. 9, 2024

(54) MULTIPLE SAMPLE CHANNEL DEVICE FOR LIQUID CHROMATOGRAPHY

(71) Applicant: Waters Technologies Corporation, Milford, MA (US)

(72) Inventors: Sylvain Gilles Cormier, Mendon, MA (US); Charles T. Murphy, Norton, MA (US); Joseph D. Michienzi, Plainville, MA (US)

(73) Assignee: Waters Technologies Corporation, Milford, MA (US)

( * ) Notice: Subject to any disclaimer, the term of this patent is extended or adjusted under 35 U.S.C. 154(b) by 203 days.

(21) Appl. No.: 17/325,830

(22) Filed: May 20, 2021

(65) Prior Publication Data

US 2021/0362153 A1 Nov. 25, 2021

Related U.S. Application Data

(60) Provisional application No. 63/028,787, filed on May 22, 2020.

(51) Int. Cl.
*B01L 3/00* (2006.01)
*F16K 99/00* (2006.01)
*G01N 30/02* (2006.01)

(52) U.S. Cl.
CPC .... *B01L 3/502715* (2013.01); *F16K 99/0013* (2013.01); *B01L 2300/0816* (2013.01);
(Continued)

(58) Field of Classification Search
None
See application file for complete search history.

(56) References Cited

U.S. PATENT DOCUMENTS

| 4,068,528 A | 1/1978 | Gundelfinger |
| 4,243,071 A | 1/1981 | Shackelford |

(Continued)

FOREIGN PATENT DOCUMENTS

| CN | 110864139 A | 3/2020 |
| EP | 1338894 A2 | 8/2003 |

(Continued)

OTHER PUBLICATIONS

Notice of Allowance in U.S. Appl. No. 17/583,559 dated Aug. 3, 2022.

(Continued)

*Primary Examiner* — P. Kathryn Wright
(74) *Attorney, Agent, or Firm* — Schmeiser, Olsen & Watts LLP

(57) ABSTRACT

Described is a multi-channel fluidic device that includes a diffusion-bonded body having a device surface and a plurality of fluid channels. Each fluid channel includes a channel segment defined in a plane that is parallel to the device surface and parallel to each of the planes of the other channel segments. The plane of each channel segment is at a depth below the device surface that is different from the depth below the device surface for the other planes. Each channel segment may have a volume equal to the volume of each of the other channel segments. One of the fluid channels may include a plurality of channel segments serially connected to each other and each defined in a plane that is different from the planes of the other channel segments.

11 Claims, 19 Drawing Sheets

(52) U.S. Cl.
CPC .................. *B01L 2300/0874* (2013.01); *B01L 2300/0887* (2013.01); *B01L 2400/0415* (2013.01); *B01L 2400/0487* (2013.01); *B01L 2400/084* (2013.01); *F16K 2099/008* (2013.01); *F16K 2099/0084* (2013.01); *G01N 2030/027* (2013.01)

(56) References Cited

U.S. PATENT DOCUMENTS

| | | | |
|---|---|---|---|
| 4,506,558 | A | 3/1985 | Bakalyar |
| 5,010,921 | A | 4/1991 | Nohl |
| 5,207,109 | A | 5/1993 | Olsen |
| 8,196,456 | B2 | 6/2012 | Hochgraeber et al. |
| 9,176,101 | B2 | 11/2015 | Moeller |
| 10,281,058 | B2 | 5/2019 | Shoykhet et al. |
| 2003/0015682 | A1* | 1/2003 | Killeen ............... F16K 99/0001 251/129.01 |
| 2003/0116206 | A1 | 6/2003 | Hartshorne et al. |
| 2005/0069454 | A1 | 3/2005 | Bell |
| 2007/0263477 | A1* | 11/2007 | Sudarsan ............. B01F 25/433 366/3 |
| 2009/0050212 | A1 | 2/2009 | Dourdeville et al. |
| 2010/0171055 | A1* | 7/2010 | Dourdeville ......... G01N 30/606 251/129.11 |
| 2011/0006237 | A1 | 1/2011 | Tower |
| 2012/0227470 | A1 | 9/2012 | Gerhardt et al. |
| 2013/0112604 | A1 | 5/2013 | Keene et al. |
| 2015/0114501 | A1 | 4/2015 | Tower |
| 2016/0054274 | A1 | 2/2016 | Cormier et al. |
| 2016/0069844 | A1 | 3/2016 | Jackson et al. |
| 2016/0238573 | A1 | 8/2016 | Venkatramani et al. |
| 2016/0305916 | A1 | 10/2016 | Olovsson |
| 2016/0310870 | A1 | 10/2016 | Olovsson |
| 2016/0313289 | A1 | 10/2016 | Olovsson |
| 2017/0216796 | A1* | 8/2017 | Sameshima ............. B01L 3/502 |
| 2017/0321813 | A1 | 11/2017 | Olovsson et al. |
| 2020/0064312 | A1 | 2/2020 | Musacchio et al. |
| 2020/0064313 | A1 | 2/2020 | Cormier et al. |
| 2020/0064316 | A1 | 2/2020 | Shang et al. |
| 2021/0396721 | A1 | 12/2021 | Fogwill et al. |

FOREIGN PATENT DOCUMENTS

| | | |
|---|---|---|
| EP | 1350759 A2 | 10/2003 |
| EP | 1447136 A1 | 8/2004 |
| WO | 2008106613 A2 | 9/2008 |
| WO | 2016089515 A1 | 6/2016 |
| WO | 2018138628 A1 | 8/2018 |

OTHER PUBLICATIONS

International Search Report and Written Opinion in PCT/US2022/013629 dated Apr. 29, 2022.
International Preliminary Report on Patentability in PCT/US2021/033399 dated Dec. 1, 2022.
International Search Report and Written Opinion in PCT/US2021/033399 dated Sep. 20, 2021.
Final Office Action in U.S. Appl. No. 16/545,540 dated Sep. 29, 2021.
Invitation to Pay Additional Fees in PCT/US2019/047214 dated Nov. 28, 2019; 14 pages.
International Preliminary Report on Patentabiliy in PCT/US2019/047214 dated Mar. 4, 2021.
International Search Report and Written Opinion in PCT/US2019/047214 dated Jan. 23, 2020; 23 pages.
Non-Final Office Action in U.S. Appl. No. 16/545,540 dated May 27, 2021.
International Preliminary Report on Patentability in PCT/US2022/013629 dated Aug. 10, 2023.

* cited by examiner

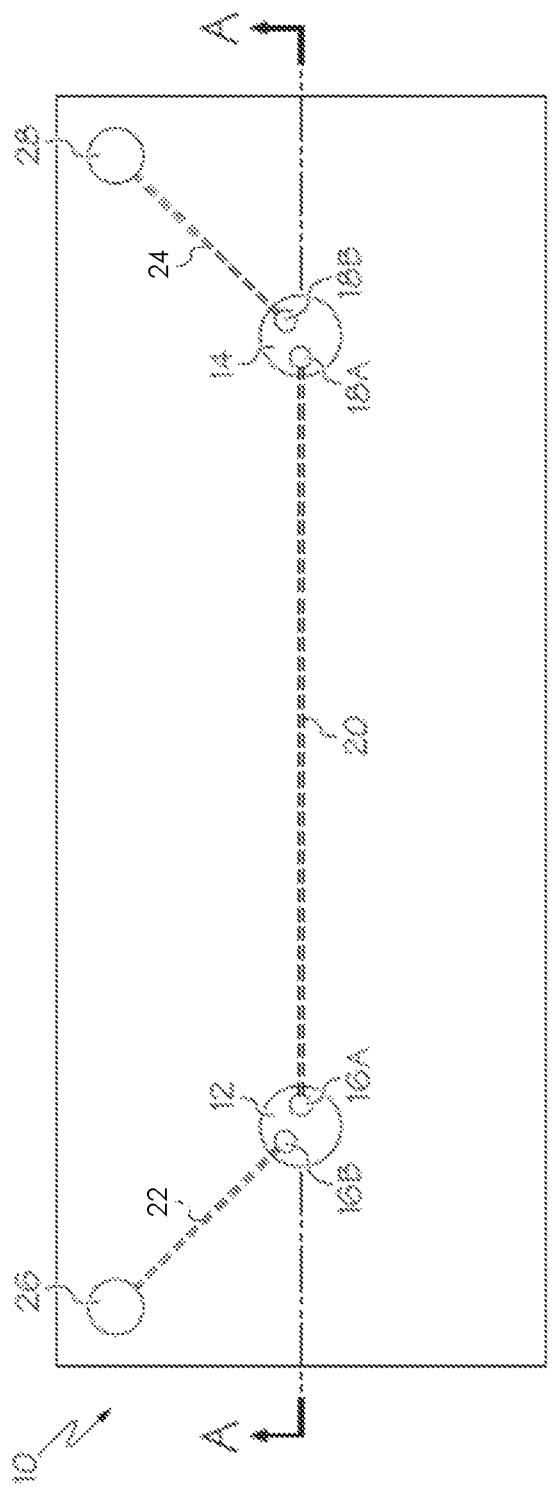
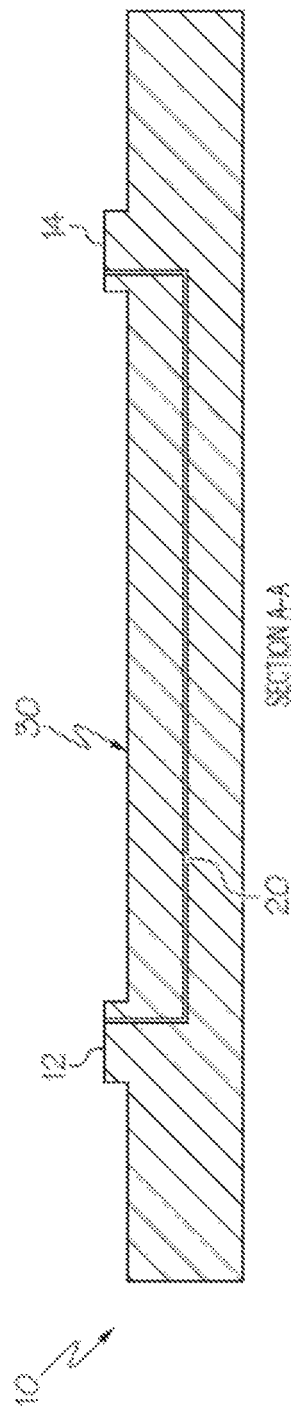

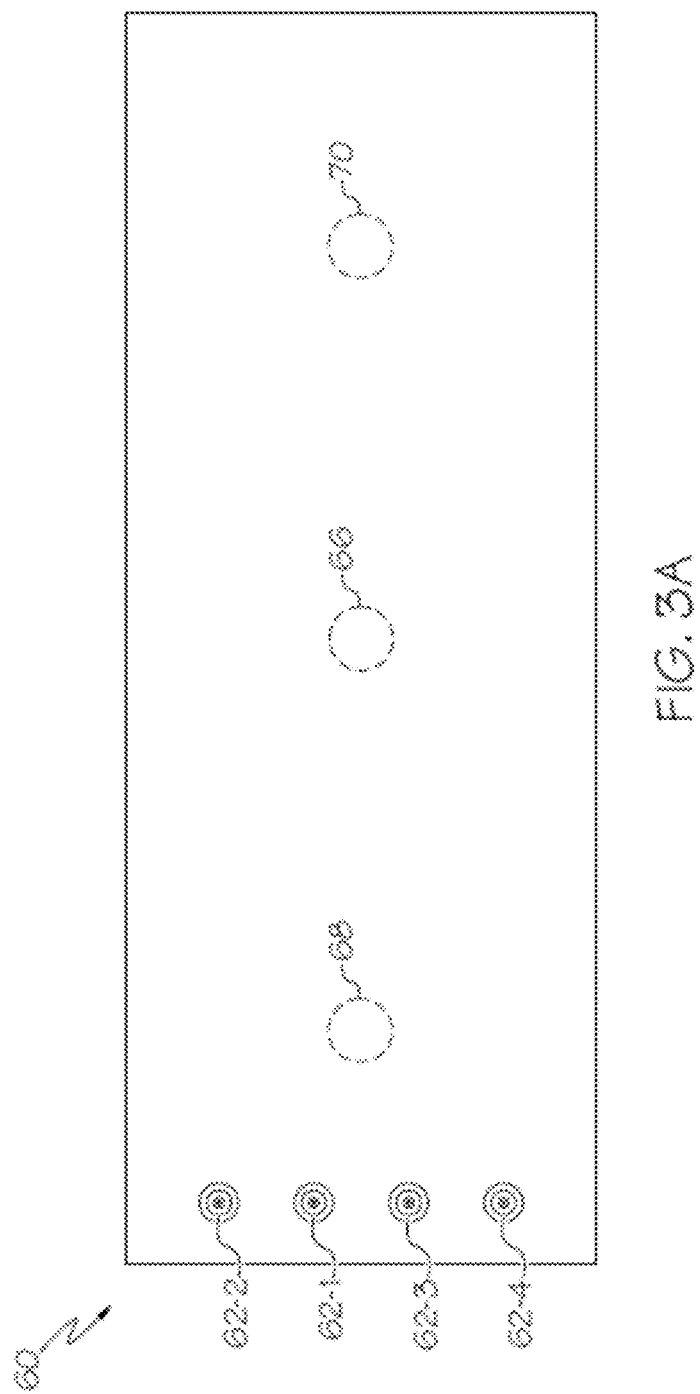

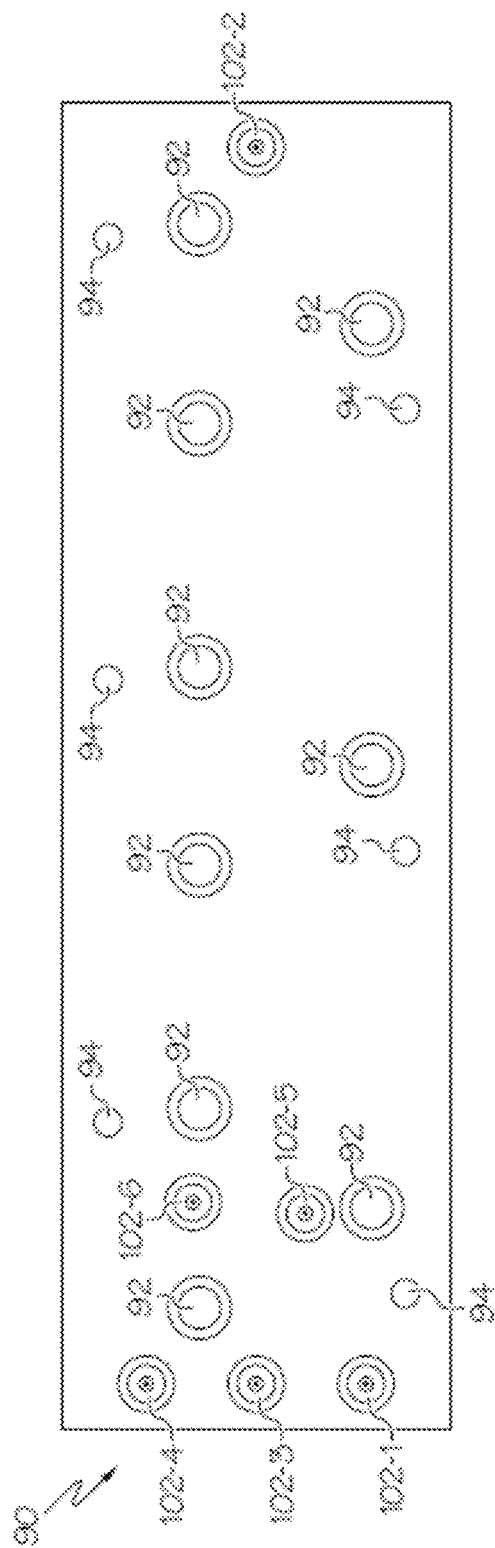

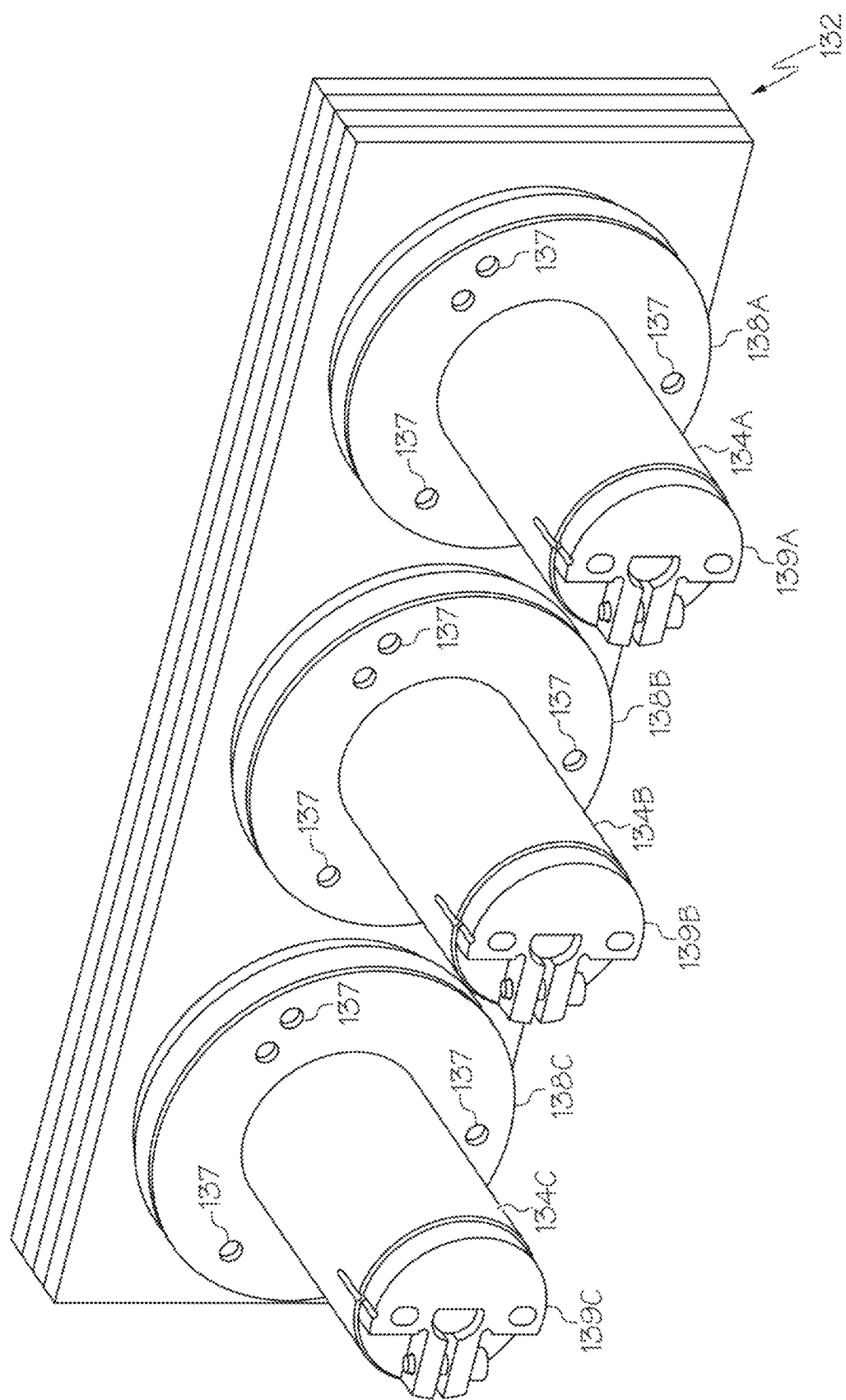

MULTIPLE SAMPLE CHANNEL DEVICE FOR LIQUID CHROMATOGRAPHY

RELATED APPLICATION

This application claims the benefit of the earlier filing date of U.S. Provisional Patent Application Ser. No. 63/028,787 filed May 22, 2020 and titled "Multiple Sample Channel Device for Liquid Chromatography," the entirety of which is incorporated herein by reference.

FIELD OF THE INVENTION

The invention relates generally to fluidic systems. More particularly, the invention relates to a diffusion bonded body having internal microfluidic channels.

BACKGROUND

Liquid chromatography systems often include multiple valves coupled to each other with tubes to achieve a desired fluidic path configuration. A large number of tubes may be connected between the valves to establish the desired fluidic path configuration. The connections required to connect the tubing can have unswept volumes that may result in carry-over and poor peak shape. Moreover, the large number of connections increases the chance of leakage, system contamination, and significant time is typically required to manually install the tubing and complete the connections.

Each tube has a volume that can vary substantially from the desired tube volume due to the large physical tolerance for the inner diameter (ID) of the tube. Thus, the chromatographic results obtained with one chromatographic system may differ markedly from the results obtained with a similar chromatographic system due to the differences in the tube volumes according to the ID manufacturing tolerances. For example, a valve configuration may be used to acquire segments of a first liquid chromatography system for introduction into a second dimension chromatography system. Alternatively, valves may be configured to consecutively sample different volumes of the same sample into different sample loops. Use of this configuration allows a smaller volume of acquired sample to be used if it is determined that an initial sample volume results in high mass loading and/or detector saturation problems. In another alternative, complex valve configurations may be used to provide an identical sample to different single-dimension chromatography systems to acquire more information about the sample than can be acquired from a single chromatography system. Each of the above valve configurations can be adversely affected by the variation in tube volumes and large number of tube connections that can leak and require significant system installation time.

SUMMARY

In one aspect, a multi-channel fluidic device includes a diffusion-bonded body having a device surface and having a plurality of fluid channels. Each of the fluid channels includes a channel segment defined in a plane that is parallel to the device surface and parallel to each of the planes of the other channel segments. The plane of each channel segment is at a depth below the device surface that is different from the depth below the device surface for each of the other channel segments.

Each of the channel segments may have a volume that is equal to the volume of each of the other channel segments. Alternatively, each of the channel segments may have a volume that is different from the volume of each of the other channel segments. The device surface may include a stator surface.

Each of the channel segments may have a shape that is the same as the shape of each of the other channel segments. Alternatively, each of the channel segments may have a shape that is different from the shape of each of the other channel segments. The shape may be an arc, a serpentine path or a hybrid serpentine arc.

Each channel segment may have a pair of ends and the multi-channel fluidic device may further include, for each of the fluid channels, a pair of orthogonal fluid channels wherein each of the orthogonal fluid channels extends from one of the ends of the channel segment. At least one of the orthogonal fluid channels for each channel segment may extend from one of the ends of the channel segment to the device surface.

One of the fluid channels may include a plurality of channel segments serially connected to each other with each channel segment defined in a plane that is different from the planes of the other channel segments. A volume of the fluid channel may include a volume of the plurality of channel segments.

In another aspect, a multi-channel fluidic device includes a diffusion-bonded body having a plurality of fluid channels and a pair of layers wherein the layers are diffusion-bonded together at an interface. Each of the fluid channels includes a channel segment defined in a plane parallel to the interface and has a volume equal to the volume of each of the other channel segments. A length of each channel segment is different from a length of each of the other channel segments and a depth of each channel segment is different from a depth of each of the other channel segments.

The device surface may include a stator surface.

Each channel segment may be arc-shaped and have a radius of curvature with respect to a center point that is different from the radius of curvature of each of the other channel segments from the center point. Each channel segment that has a radius of curvature that is greater than the radius of curvature of another one of the channel segments has a channel depth that is less than the channel depth of that other one of the channel segments. Each channel segment may be arranged at an angular orientation within the plane and in respect to the center point that is different from the angular orientation of each of the other channel segments.

Each channel segment may have a pair of ends and each of the fluid channels may include a pair of orthogonal fluid channels wherein each orthogonal fluid channel extends from one of the ends of the channel segment. At least one of the orthogonal fluid channels for each channel segment may extend from one of the ends of the channel segment to the device surface.

BRIEF DESCRIPTION OF THE DRAWINGS

The above and further advantages of this invention may be better understood by referring to the following description in conjunction with the accompanying drawings, in which like reference numerals indicate like elements and features in the various figures. For clarity, not every element may be labeled in every figure. The drawings are not necessarily to scale, emphasis instead being placed upon illustrating the principles of the invention.

FIG. 1A is a top view of an embodiment of a stator body.

FIG. 1B is a cutaway side view of the stator body of FIG. 1A.

FIG. 3A is a top view of an example of a stator body that can be used as part of a multi-valve array to replace the multi-valve array of FIG. 2.

FIG. 4A is a top view of an example of a stator body that can be used in a multi-valve array for acquiring different volumes of sample for a chromatographic injection.

FIG. 6B is a top perspective back view of the example of a multi-valve array of FIG. 6A.

DETAILED DESCRIPTION

Figure 2:
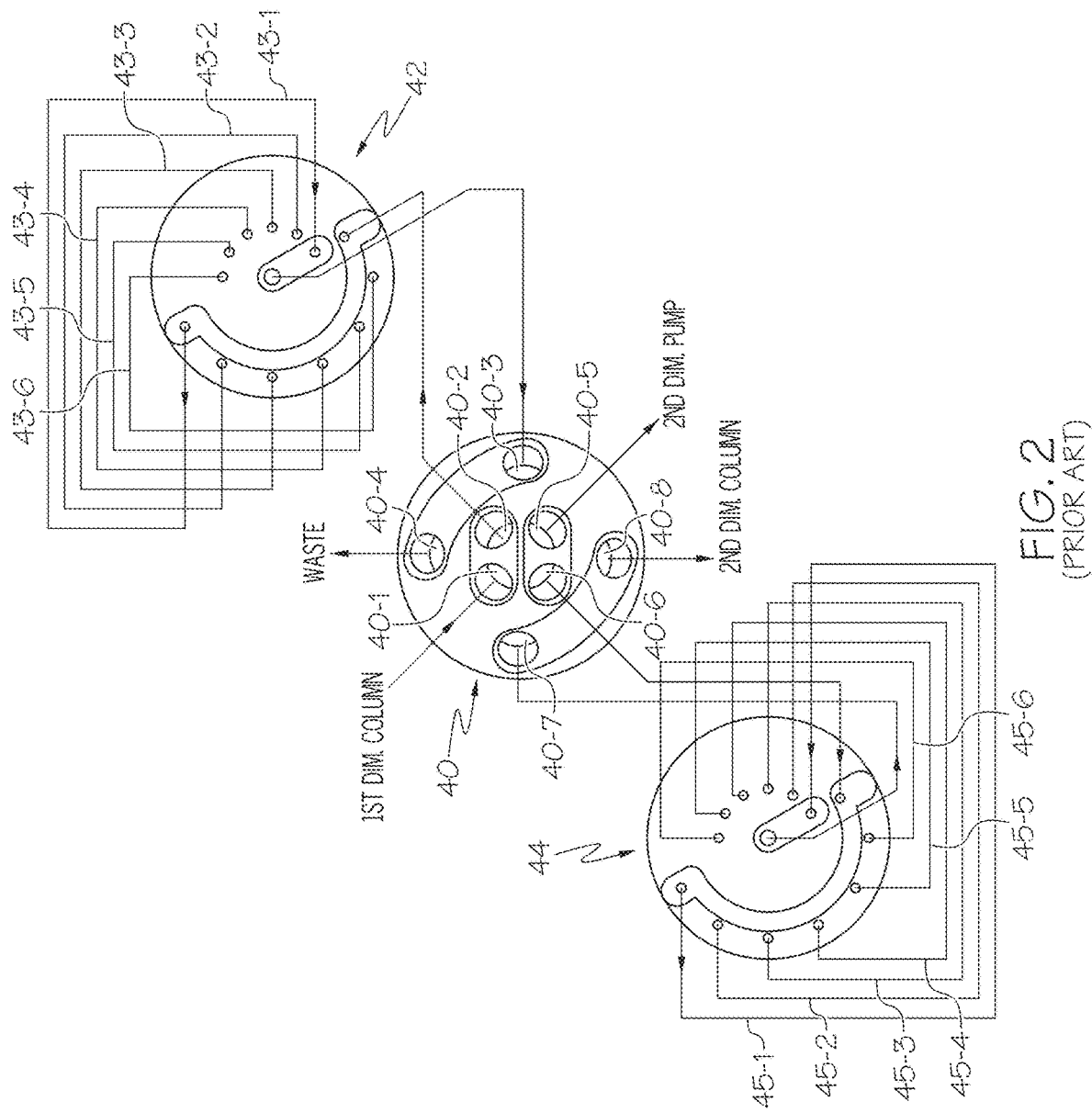
FIG. 2 is a diagram of a multi-valve array for acquiring samples from a chromatography system in a first chromatographic dimension for introduction into a second chromatography system of a second chromatographic dimension.

Reference in the specification to "one embodiment" or "an embodiment" means that a particular feature, structure or characteristic described in connection with the embodiment is included in at least one embodiment of the teaching. References to a particular embodiment within the specification do not necessarily all refer to the same embodiment.

In brief overview, embodiments disclosed herein are directed to a multi-channel fluidic device, such as a stator array, that includes at least one stator surface and directed to a mounting assembly for the stator array. Each stator surface is configured to engage and seal against a rotor surface of a corresponding rotary valve. Each stator surface includes stator ports to communicate with rotor ports. In some embodiments, there is at least one fluid channel inside the stator body that couples a stator port in one of the stator surfaces (i.e., stator "faces") with a stator port in another one of the stator surfaces.

The stator array avoids the need to use a large number of tubes to provide fluidic connections between two or more rotary valves. Instead, stator ports in different stator surfaces are internally coupled to each other within a single block that includes the stator surfaces for the rotary valves. By eliminating most of the tubing connections, the array is more robust and leaks and possible contamination points are significantly reduced. In addition, chromatographic band dispersion and peak tailing can be reduced as the volumes associated with tubing connectors are eliminated. The block can be fabricated from individual layers of material using a diffusion bonding technique. Use of the stator body reduces the complexity and time required to set up various chromatographic instrument configurations because most of the fluidic connections are contained inside the stator array block. The multi-valve array can be used for a number of applications including, for example, improving loop-to-loop volume accuracy and precision for the collection of samples for introduction into a second chromatographic dimension. Additionally, the stator array has improved volume characteristics for the internal sample channels as compared to conventional external sample loops.

The present teaching will now be described in more detail with reference to embodiments thereof as shown in the accompanying drawings. While the present teaching is described in conjunction with various embodiments and examples, it is not intended that the present teaching be limited to such embodiments. On the contrary, the present teaching encompasses various alternatives, modifications and equivalents, as will be appreciated by those of skill in the art. Those of ordinary skill having access to the teaching herein will recognize additional implementations, modifications and embodiments, as well as other fields of use, which are within the scope of the present disclosure.

The embodiments described below include the use of a multi-valve array in which two or more rotary valves share a stator body (i.e., stator "block") that includes a stator surface for each valve. For example, the rotary valves may be rotary shear seal valves in which each valve has a rotor surface that is parallel to and in contact with one of the stator surfaces. Each rotor surface is configured to rotate about an axis that is orthogonal to the rotor surface and the corresponding stator surface on the stator block during valve switching to reconfigure the communication of fluid flow paths coupled to the valve. In some examples, multiple sample loops in the multi-valve array may used in a process to acquire sample slices from chromatographic peaks in the eluent of a first dimension chromatography system and subsequently introduce the sample slices into a second dimension chromatography system. For example, multiple slices of a peak may be acquired if there is a possibility that the sample composition across a peak is not constant. In other examples, multiple sample loops within the block having different volumes may be loaded with sample, potentially eliminating the need for partial loading of a sample loop having a larger volume.

FIGS. 1A and 1B show a top down view and a cutaway side view, respectively, of an embodiment of a stator body 10 having a first stator surface 12 and a second stator surface 14. When assembled as a rotary valve array, each stator surface engages a rotor surface of a corresponding actuator portion of a rotary valve. In the figure, only two stator ports 16 and 18 are indicated on each stator surface 12 and 14, respectively. One set of stator ports 16A and 18A are provided at the end of a fluid channel 20 that extends between the two stator surfaces 12 and 14. The fluid channel 20 is shown as a dashed line in FIG. 1A as it is inside the stator body 10. The other stator ports 16B and 18B are at one end of fluid channels 22 and 24, respectively, which terminate at their other ends at an external ports 26 and 28, respectively, at an external surface 30 of the stator body. The external ports 26 and 28 may be configured to couple to tubing or other form of external channel using, for example, a fitting at an end of the tubing. Although the stator surfaces 12 and 14 are depicted as two regions raised above the external surface 30, in other embodiments the external surface 30 may be at a similar or greater height as long as there is a separation between the stator surfaces 12 and 14 from the neighboring regions of the external surface 30 so that the rotary valves may operate properly and not interfere with each other. The minimum separation between the stator surfaces 12 and 14 may be limited according to the dimensions of the upper sections of the rotary valves which includes the actuator portions and rotors, and which are secured to the stator body 10 using bolts or other attachment means.

In other embodiments, more complex fluid channel routing may be used with greater numbers of internal fluid channels and/or external ports on the external surface of the stator body. In still other examples, there may be greater numbers of stator surfaces to accommodate a greater number of rotary valves. In some embodiments, the fluid channels are microfluidic channels. For example, the fluid channels may have volumes of a few microliters or less.

The stator body 10 may be fabricated as a single plate using a solid-state diffusion bonding process in which two or more parallel layers of material are joined together. The layers are forced against each other under pressure at an elevated temperature (e.g., a temperature in a range of about 50% to 90% of the absolute melting point of the material) for a duration ranging from a few minutes to several hours). The pressure and temperature are then reduced before repeating one or more additional cycles at the elevated temperature and pressure. Examples of materials used to create the diffusion-bonded stator body include titanium, stainless steel, and various types of ceramics and polymers.

The diffusion bonding process may be performed where one or more of the layers has a channel formed along a surface that will abut an adjacent surface of a neighboring layer. These internal or "embedded" channels, along with vertical channels formed at their ends, define fluid channels used to communicate fluids between the rotors and inlets and outlet on the external surface 30 of the stator body 10. Depending on the number of layers, a large number of fluid channels may be formed in the stator body 10. In some embodiments, the fluid channels are defined between different layers at different depths so that some fluid channels may cross above or below other fluid channels to avoid interference and to allow for complex fluid channel configurations.

When performing two-dimensional chromatography using conventional rotary valves, external tubing is typically used for the sample loops. Each tube requires a connection at each end to one of the rotary valves. Generally, it is desirable to have each sample loop hold the same volume of liquid as the other sample loops. For small sample volumes, the length of the tubing can be reduced; however, there is a fundamental limit to reducing the length as the tubing is required to bridge between its coupling ports on the valve. The inner diameter (ID) of the tubing can be reduced to achieve a smaller sample loop volume. However, due to the manufacturing tolerance on the ID, the variations in volume for what are intended to be equivalent volume sample loops becomes an increasingly larger percentage of the desired sample loop volume with decreasing ID.

Table 1 lists the nominal, minimum and maximum volumes associated with different external sample loop IDs and lengths according to different manufacturing tolerances for the ID and length. It can be seen that the greatest percentage variations in volume are associated with the smallest sample loop volumes.

TABLE 1

ACQUITY HYPO SAMPLE LOOPS

| Hypo Sample Loop Size (uL) | Nominal ID (in) | Tolerance + | Tolerance − | Nominal Length (in) | Tolerance + | Tolerance − | Nominal Volume (uL) | Minimum Volume (uL) | Maximum Volume (uL) |
|---|---|---|---|---|---|---|---|---|---|
| 1 | 0.004 | 0.0005 | 0.0005 | 5.00 | 0.03 | 0.03 | 1.03 | 0.78 | 1.31 |
| 2 | 0.004 | 0.0005 | 0.0005 | 9.75 | 0.03 | 0.03 | 2.01 | 1.53 | 2.55 |
| 5 | 0.007 | 0.0005 | 0.0005 | 7.95 | 0.03 | 0.03 | 5.01 | 4.31 | 5.78 |
| 10 | 0.010 | 0.0005 | 0.0005 | 7.79 | 0.03 | 0.03 | 10.03 | 9.01 | 11.10 |

ACQUITY SAMPLE LOOPS

| Sample Loop Size (uL) | Nominal ID (in) | Tolerance + | Tolerance − | Nominal Length (in) | Tolerance + | Tolerance − | Nominal Volume (uL) | Minimum Volume (uL) | Maximum Volume (uL) |
|---|---|---|---|---|---|---|---|---|---|
| 1 | 0.004 | 0.001 | 0.001 | 5.00 | 0.03 | 0.03 | 1.03 | 0.58 | 1.62 |
| 2 | 0.005 | 0.001 | 0.001 | 6.20 | 0.03 | 0.03 | 1.99 | 1.27 | 2.89 |
| 5 | 0.007 | 0.001 | 0.001 | 7.93 | 0.03 | 0.03 | 5.00 | 3.66 | 6.56 |
| 10 | 0.012 | 0.001 | 0.001 | 5.40 | 0.03 | 0.03 | 10.01 | 8.36 | 11.81 |
| 10 - Bent | 0.012 | 0.001 | 0.001 | 5.40 | 0.03 | 0.03 | 10.01 | 8.36 | 11.81 |
| 20 | 0.012 | 0.001 | 0.001 | 10.79 | 0.03 | 0.03 | 20.00 | 16.76 | 23.53 |
| 50 | 0.020 | 0.000 | 0.002 | 9.76 | 0.06 | 0.06 | 50.25 | 40.45 | 50.55 |
| 100 | 0.030 | 0.000 | 0.002 | 8.63 | 0.06 | 0.06 | 99.96 | 86.47 | 100.66 |
| 250 | 0.030 | 0.000 | 0.002 | 21.59 | 0.06 | 0.06 | 250.08 | 217.25 | 250.78 |

In contrast, Table 2 shows the nominal, minimum and maximum volumes associated with different sample loops that can be formed in a diffusion-bonded body, such as the stator body 10 described with respect to FIGS. 1A and 1B. The smaller manufacturing tolerances for ID and length result in significantly better control of the volume for small sample loops. Thus, a diffusion-bonded stator body can have smaller sample volumes than can be achieved with external sample loops while having the additional advantage of more accurate volume control.

TABLE 2

DIFFUSION BONDED LOOPS

| Sample Loop Size (uL) | Nominal ID (in) | Tolerance + | Tolerance − | Nominal Length (in) | Tolerance + | Tolerance − | Nominal Volume (uL) | Minimum Volume (uL) | Maximum Volume (uL) |
|---|---|---|---|---|---|---|---|---|---|
| 1 | 0.010 | 0.00005 | 0.00005 | 0.78 | 0.00005 | 0.00005 | 1.000 | 0.990 | 1.010 |
| 2 | 0.010 | 0.00005 | 0.00005 | 1.55 | 0.00005 | 0.00005 | 2.000 | 1.980 | 2.020 |
| 5 | 0.010 | 0.00005 | 0.00005 | 3.89 | 0.00005 | 0.00005 | 5.000 | 4.958 | 5.050 |
| 10 | 0.012 | 0.00005 | 0.00005 | 5.40 | 0.00005 | 0.00005 | 10.008 | 9.925 | 10.092 |
| 20 | 0.012 | 0.00005 | 0.00005 | 10.79 | 0.00005 | 0.00005 | 19.997 | 19.831 | 20.165 |
| 50 | 0.020 | 0.00005 | 0.00005 | 9.76 | 0.00005 | 0.00005 | 50.246 | 49.995 | 50.498 |
| 100 | 0.030 | 0.00005 | 0.00005 | 8.64 | 0.00005 | 0.00005 | 100.080 | 99.746 | 100.414 |

FIG. 2 shows a multi-valve array that is used to acquire samples from a chromatography system in a first chromatographic dimension and to introduce these samples into a second chromatography system of a second chromatographic dimension. The configuration includes a first rotary valve 40 having eight fluid connections 40-1 to 40-8, a second rotary valve 42 associated with a first dimension chromatography system and having fourteen fluid connections 42-1 to 42-14, and a third rotary valve 44 associated with a second dimension chromatography system and having fourteen fluid connections 44-1 to 44-14.

The multi-valve array is shown in a state in which the system flow from the first dimension chromatography system is received at port 40-1 and exits through port 40-2 to the second valve 42. In this state, the system flow may contain a chromatographic peak such that the sample in the peak is loaded into an external sample loop 43-1 that is the active one of the six external sample loops 43-1 to 43-6. Alternatively, the second valve 42 may be switched so that only a portion of the sample in the peak is loaded into the external sample loop 43-1 and so another portion of the sample in the peak may be loaded into a different sample loop 43. Liquid displaced from the external sample loops 43 flows back to the first valve 40 at port 40-3 before exiting to waste through port 40-4. The second valve 42 may be switched at different times corresponding to the presence of the different chromatographic peaks so that a series of samples from the peaks, or sample slices of an individual peak, may be stored in the external sample loops 43.

The system flow of the second dimension upstream of the chromatographic column is received at the first valve at port 40-5 and flow from port 40-6 to the third valve 44 into one of six external sample loops 45-1 to 45-6 that can hold sample for introduction into the second dimension chromatography system. The system flow displaces the sample stored in the external sample loop 45-1 that is part of the active flow path according to the current state of the third valve 44. The displaced sample is received at port 40-7 of the first valve 40 and exits at port 40-8 to flow to the chromatographic column of the second chromatography system. The third valve 44 may be switched to introduce another one of the stored samples from the other external sample loops 45 into the second chromatography system.

The multi-valve array may be operated in a complementary state by reconfiguring the state of the first valve 40 so that the roles of the second and third valves 42 and 44 are reversed from that shown in the figure. In the complementary configuration, the system flow from the first dimension chromatography system is received at the third valve 44 which is used to sample chromatographic peaks, or portions of peaks, from the first chromatography system. The system flow of the second dimension is now managed by the second valve 42 which operates to inject samples previously stored into its external sample loops 43 into the flow to the chromatographic column for the second dimension.

To accommodate the fluid paths in the illustrated multi-valve array, eight fluid connections are used for the first valve 40 and 14 fluid connections are used for each of the second and third valves 42 and 44, for a total of 36 fluid connections. Typically, these connections are made using compression screws and ferrules. The large number of fluid connections results in a significant chance of leakage from at least one fluid connection.

Figure 3B:
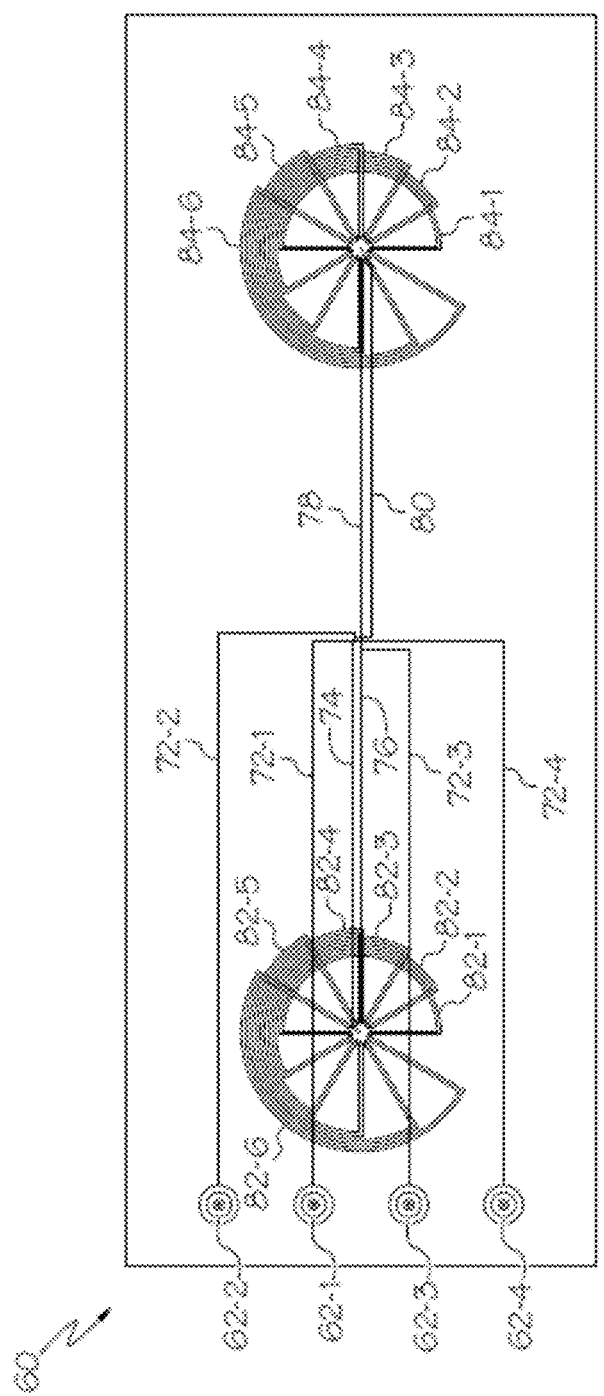
FIG. 3B shows the stator body of FIG. 3A; however, the body material is depicted as transparent so that internal fluid channels are visible.
Figure 3C:
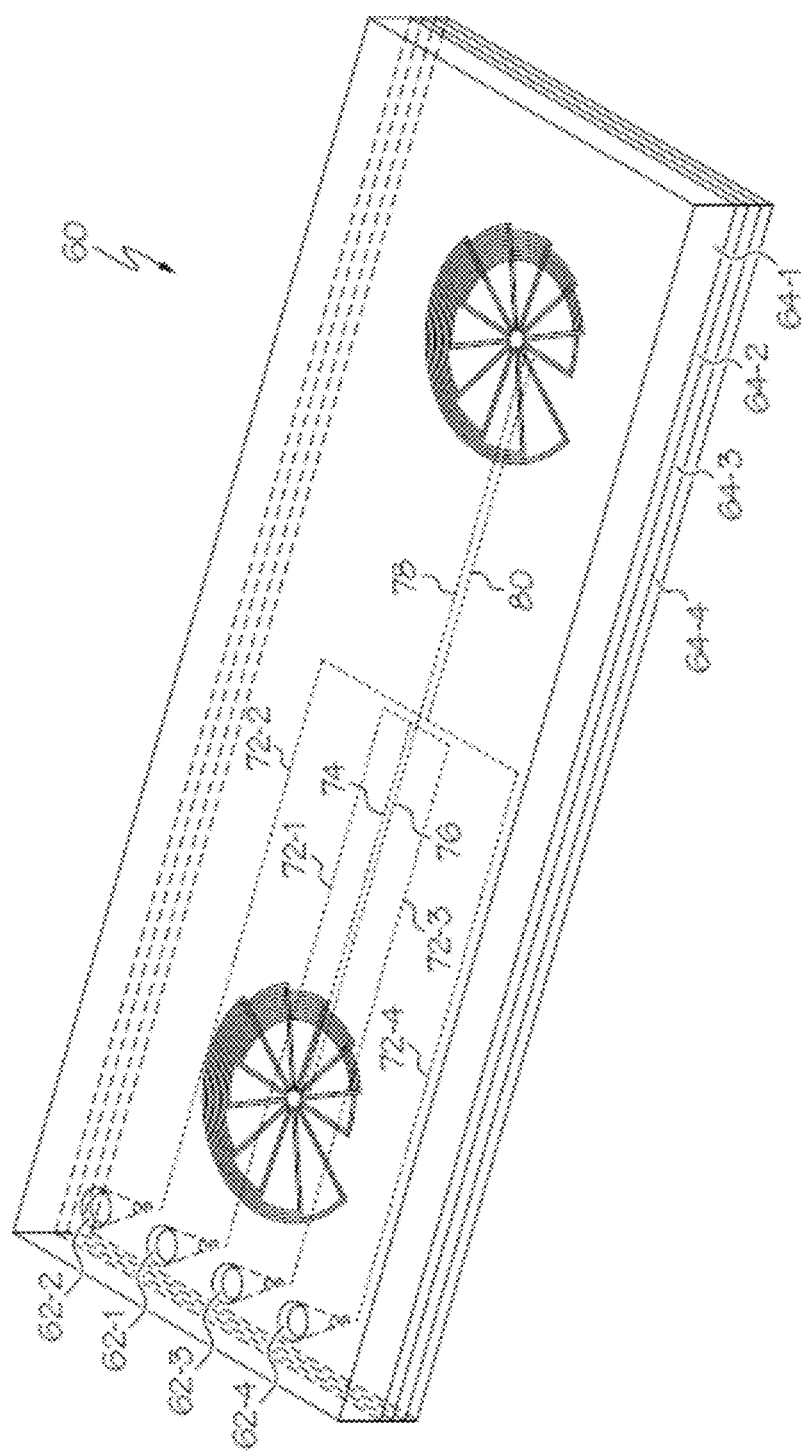
FIG. 3C is a perspective view of the transparent stator body of FIG. 3B depicting the four discrete layers used in the diffusion bonding process to fabricate the stator body.

FIG. 3A shows a top view of an example of a stator body 60 that can be used as part of a multi-valve array that replaces the multi-valve array depicted in FIG. 2. As referred to below with respect to the figures, the top side of the stator body 60 (and other stator bodies described below) is the side which includes ports for coupling to external conduits and the bottom side includes stator surfaces to engage rotor surfaces of rotary valve actuators. FIG. 3B is a view of the stator body 60 similar to that of FIG. 3A; however, the material is depicted as transparent so that internal fluid channels are visible. FIG. 3C is a perspective view of the transparent stator body 60 shown in FIG. 3B; however, the four layers 64-1 to 64-4 used in the diffusion bonding process are depicted. It should be recognized that the discrete layers 64 are not distinguishable in the stator body 60 at the end of the diffusion bonding process. The description of the stator body 60 provided below references all views presented in FIGS. 3A to 3C.

The stator body 60 includes four ports port 62-1 to 62-4 which are functionally similar to certain ports of the first rotary valve 40 shown in FIG. 2. Specifically, port 62-1 corresponds to port 40-1, port 62-2 corresponds to port 40-4, port 62-3 corresponds to port 40-5 and port 62-4 corresponds to port 40-8.

The stator body 60 includes three stator surfaces 66, 68 and 70 each having multiple stator ports. The stator surfaces 66, 68 and 70 are disposed on an opposite side (bottom side) of the body 60 form the four ports 62 as shown by the dashed circles in FIG. 3A. When used as part of a two-dimensional chromatography system, one of the ports 62-1 is in fluid communication with the eluent from a chromatographic column in a first dimension chromatography system and another port 62-2 is an outlet port that is coupled to a waste fluid path. The third port 62-3 receives a system flow of a second dimension chromatography system upstream of the second dimension chromatographic column and the fourth port 62-4 is an outlet port that provides the system flow to the inlet of the second dimension chromatographic column.

Ports 62-1 to 62-4 are in fluid communication with the central stator surface 66 through inlet or outlet fluid channels 72-1 to 72-4, respectively. The central stator surface 66 is also in fluid communication with stator surface 68 through fluid channels 74 and 76, and with stator surface 70 through fluid channels 78 and 80.

The stator body 60 includes two sets of internal sample channels. One set includes six sample channels 82-1 to 82-6 associated with stator surface 68 and the other set includes six sample channels 84-1 to 84-6 associated with stator surface 70. Each sample channel 82, 84 includes two radial channel segments formed at a depth corresponding to the interface of layers 64-1 and 64-2. A first end of each radial channel segment is coupled, through a vertical channel segment, to a corresponding one of the stator surfaces 68 or 70. The second end of each radial channel segment is coupled, through a short vertical path, to one end of an arc-shaped channel segment (portion of a circumferential path). The arc-shaped channel segments are formed at a depth corresponding to the interface of layers 64-2 and 64-3. Thus, the full path of a sample channel is defined by two radial channel segments, an arc-shaped channel segment, two vertical channel segments to the two associated stator ports and two additional vertical channel segments that couple the arc-shaped segment to the two radial segments.

All the sample channels 82, 84 are machined to tight tolerances, for example, as listed in Table 2. Consequently, the sample channels have better volume accuracy than conventional external sample loops. Each of the sample channels 82, 84 can be formed of channel segments having a length, width and depth that are accurately controlled so that each sample channel can be made to have a volume that is substantially equal to the volumes of the other sample channels. As used herein with respect to volumes, "equal to" and "substantially equal to" means that the volumes may differ, for example, due to manufacturing tolerances; however, such differences are sufficiently small so as to result in negligible differences in chromatographic measurements. The interchannel sample volume accuracy can be +/−1% which is an accuracy that cannot be achieved with external sample loops utilizing typical commercially-available tubing for plumbing liquid chromatography systems. Consequently, for a sample that fully loads each of the sample channels, the chromatographic measurement data are substantially the same regardless of which sample channel is used for sample injection.

To avoid interference in terms of intersecting channels, the fluid channels are formed at different interfaces of the four layers 64. For example, the lengths (i.e., non-vertical segments) of the fluid channels 72, 74, 76, 78 and 80 may be formed at the interface of layers 64-3 and 64-4. In alternative embodiments, the number of layers may differ. For example, for more complex multi-valve arrangements having additional stator surfaces, sample channels and/or external ports, additional layers may be used to accommodate a more complex fluid channel layout. Each fluid channel typically includes a short vertical segment at it ends to connect it to a port on one of the stator surfaces or one of the external ports 62. In addition, each sample channel includes a vertical segment that extends from one end of the arc-shaped segment through the intervening layer to one end of the radial segment. Vertical segments can be formed, for example, by drilling through one or more layers before diffusion bonding the layers together.

During operation, the system flow for the first dimension is received at port 62-1, flows through fluid channel 72-1 to the central stator surface 66 and back out of the stator body 60 through fluid channel 72-2 and port 62-2 to waste. The left valve is controlled such that the first dimension system flow is directed to one of the sample channels 82 for loading with a sample (e.g., peak slice) as the sample is detected or otherwise known to be present in the first dimension system flow, otherwise the system flow exits to waste. The right valve is controlled such that the second dimension system flow through fluid channel 72-3 is directed to one of the sample channels 84 to displace the contained sample into the system flow toward the second dimension chromatographic column. Thus, the left and right valves can be operated to perform sample loading for the first chromatographic dimension and sample introduction into the second chromatographic dimension, respectively. The center valve can be switched to change which set of sample channels 82 or 84 is used for acquiring the first dimension samples and used for introducing previously acquired first dimension samples into the second dimension system flow.

In the embodiments described above with respect to FIGS. 3A to 3C, there are six sample channels for each set. It should be recognized that in alternative embodiments, the number of sample channels per set can be as few as one or any other number of sample channels that can be accommodated by the physical size of the device and the layout of the fluid channels.

Figure 4B:
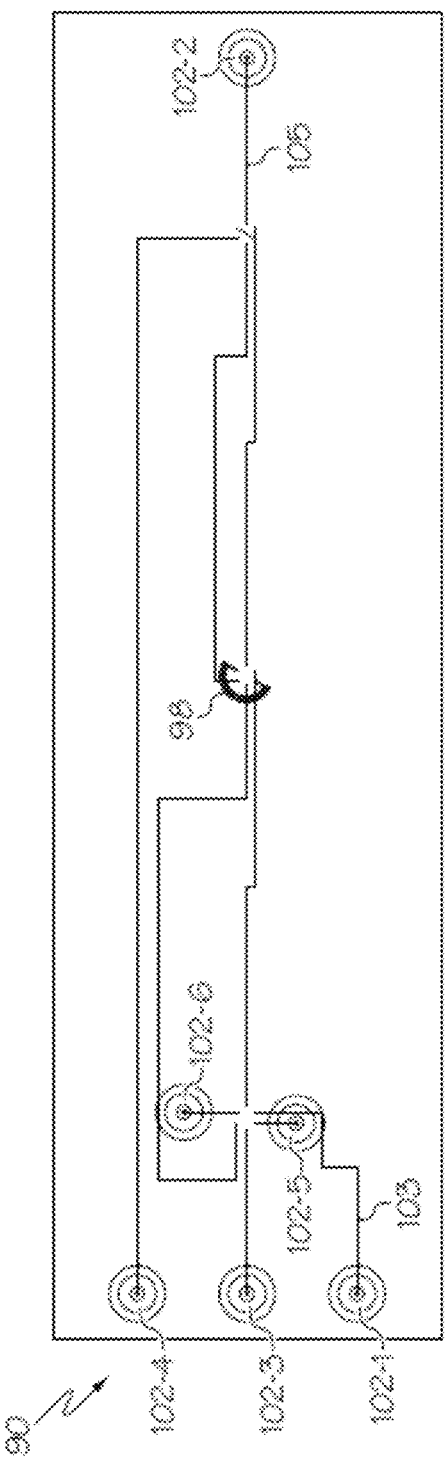
FIG. 4B is a transparent top view of the stator body of FIG. 4A.
Figure 4D:
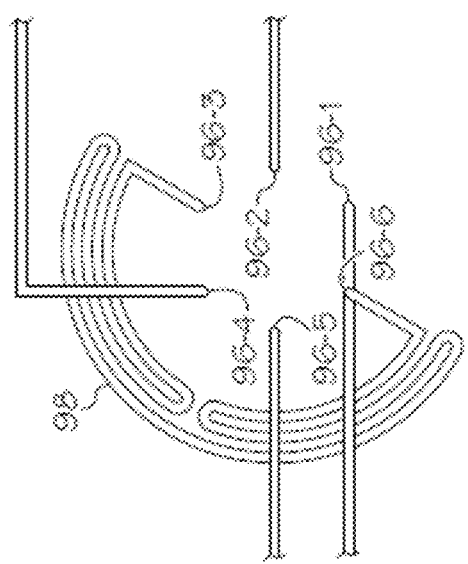
FIG. 4D is an expanded view of the central portion of FIG. 4B.
Figure 4C:
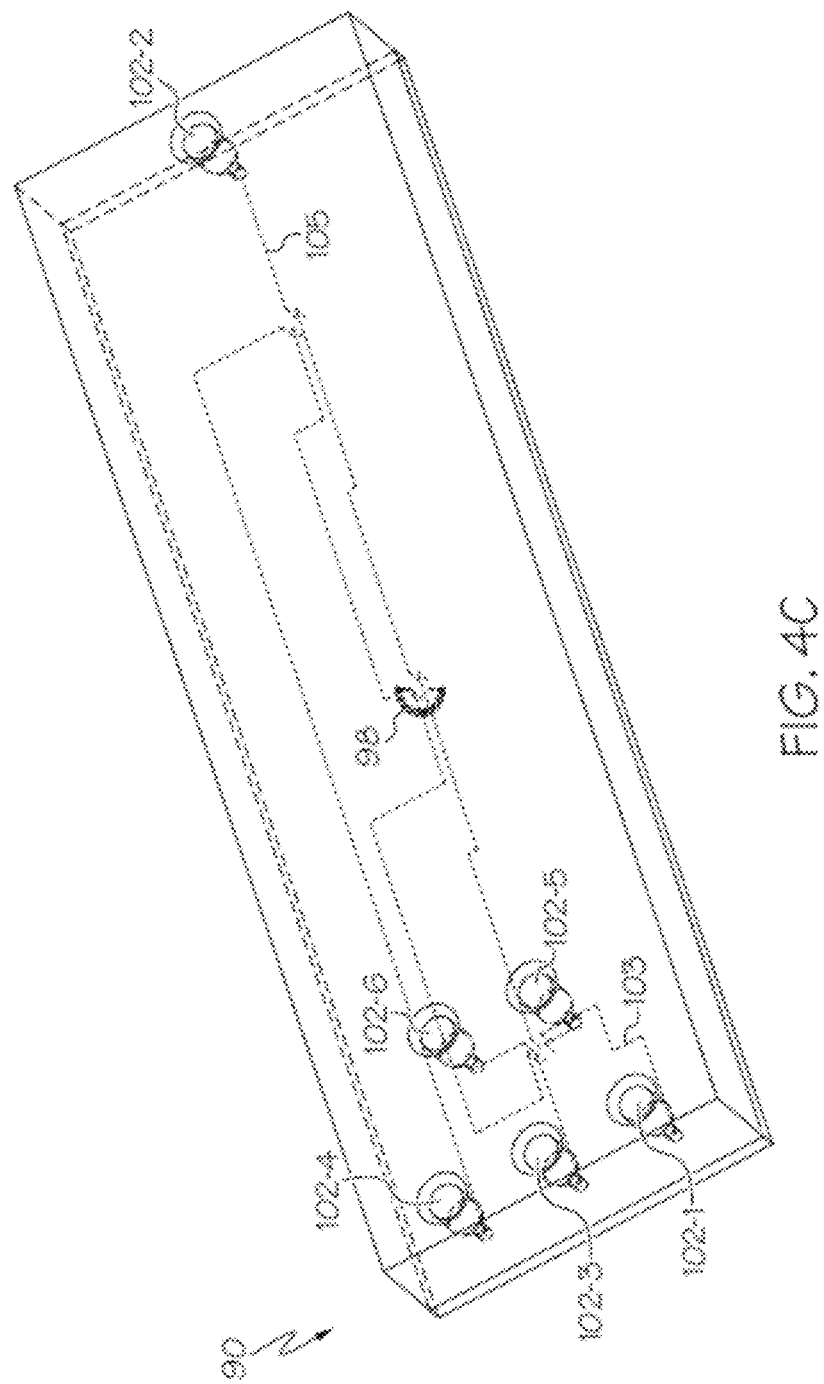
FIG. 4C is transparent bottom perspective view of the stator body of FIG. 4A.

FIGS. 4A, 4B and 4C are a top view, transparent top view and transparent top perspective view, respectively, of an example of a stator body 90 that can be used as part of a multi-valve array for acquiring different volumes of sample for a chromatographic injection. Certain holes 92 and 94 are not shown in FIGS. 4B and 4C to improve the clarity of the remaining features in the figures. FIG. 4D is an expanded view of the central portion of FIG. 4B and shows how various internal fluid channels terminate at one of the stator ports 96-1 to 96-6. Also shown is a hybrid arc and serpentine layout to a fluid channel that couples stator ports 96-3 and 96-6.

As described above, the stator body 90 can be fabricated using a diffusion bonding process so that multiple fluid channels can be formed inside the body 90. By way of non-limiting examples of materials, the stator body 90 may be fabricated from one or more of titanium, stainless steel, and various types of ceramic materials and polymers.

The stator body 90 includes bolt holes 92 and alignment pin holes 94 used to attach each of three rotary valve actuators and rotors to a corresponding stator surface. Six ports (ports 102-1 to 102-6) are provided to conduct liquid to or from the stator body 90. Specifically, port 102-1 is at one end of a chromatography system inlet channel and is configured to receive a system flow (mobile phase) of a chromatography system and port 102-2 is at one end of a chromatography system outlet channel and is configured to provide an outlet for the system flow. Ports 102-3 and 102-4 are sample inlet and outlet ports, respectively, for a liquid flow containing a sample to be loaded into three distinct sample channels. Ports 102-5 and 102-6 allow for coupling of an external sample loop to the stator body 90. In alternative embodiments, there may be one or more additional ports to couple to additional external sample loops or ports 102-5 and 102-6 may be omitted.

The plurality of internal fluid channels inside the stator body 90 enables a multi-valve array to realize an improvement in performance relative to a typical valve configuration that uses only external sample loops. For example, unswept volumes corresponding to connections necessary for external couplings are reduced and therefore carryover and cross-contamination are also reduced. The sample channels formed in the stator body 90 enable dimensional and volume accuracies that are not achievable with external sample loops. Consequently, multiple internal sample channels of different volumes can be used instead of resorting to partial filling of external sample loops because the volumes of the internal sample channels and any external sample loops can cover a larger range of volumes than would be possible using partial sample loop filling. Table 3 shows nominal, minimum and maximum volumes associated with 1.0 µl and 2.0 µl sample channels that can be formed in a diffusion-bonded body, such as the illustrated stator body 90. The smaller manufacturing tolerances for ID and length result in significantly better control of the volume for small sample channels. Thus, a diffusion-bonded stator body can hold smaller sample volumes than external sample loops while having the additional advantage of more accurate volume control. Regardless, the stator body 90 can still allow the partial loop filing of an external sample loop (e.g., a sample loop connected at ports 102-5 and 102-6) or a large volume internal sample channel.

The multi-valve array can be configured with different size sample channels and loops to accommodate different application modes. By way of non-limiting examples, an array used for small molecule applications can include a 10 nL internal sample channel, a 100 nL internal sample channel and a 1.0 µL external sample loop, and an array used for large molecule applications can include a 1.0 µL external sample loop, a 5.0 µL external sample loop and a 20.0 µL external sample loop.

Figure 5A:
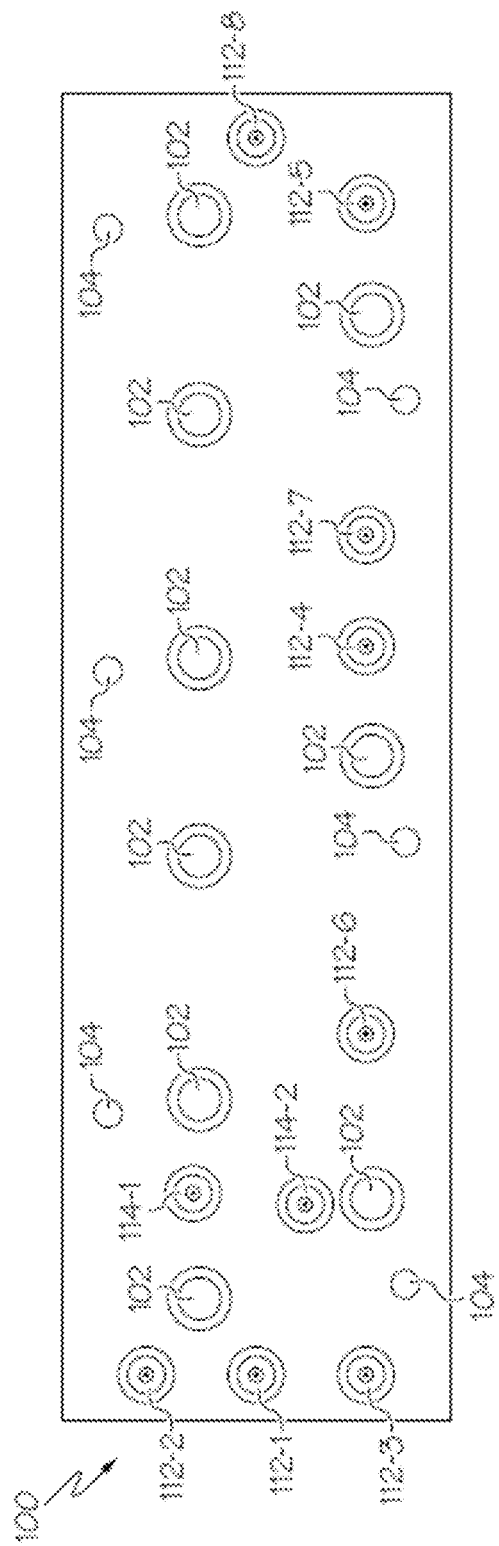
FIG. 5A is a top view of another example of a stator body that that can be used in a multi-system injector array.
Figure 5B:
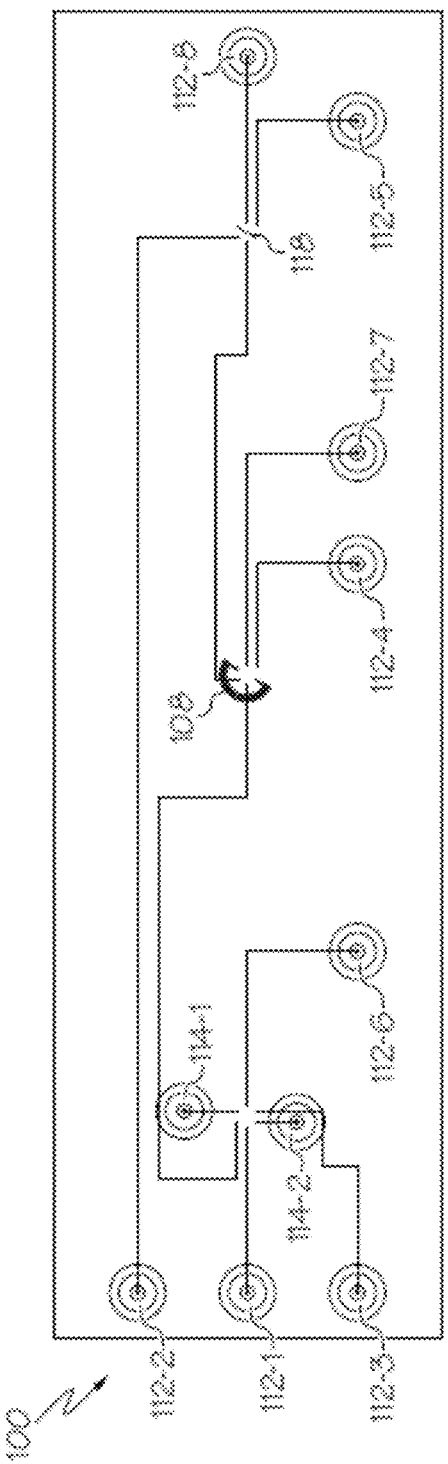
FIG. 5B is a transparent top view of the stator body of FIG. 5A.
Figure 5D:
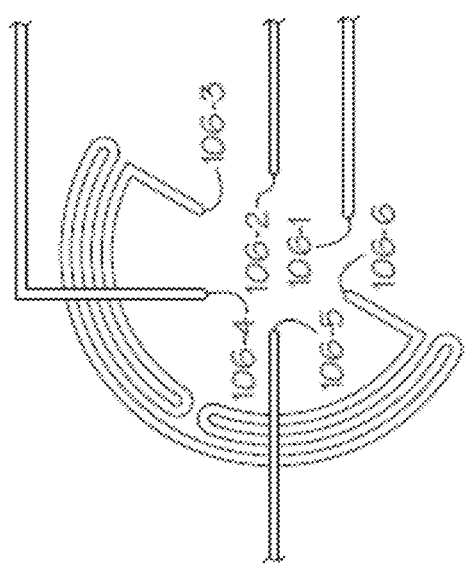
FIG. 5D is an expanded view of the central portion of FIG. 5B.
Figure 5C:
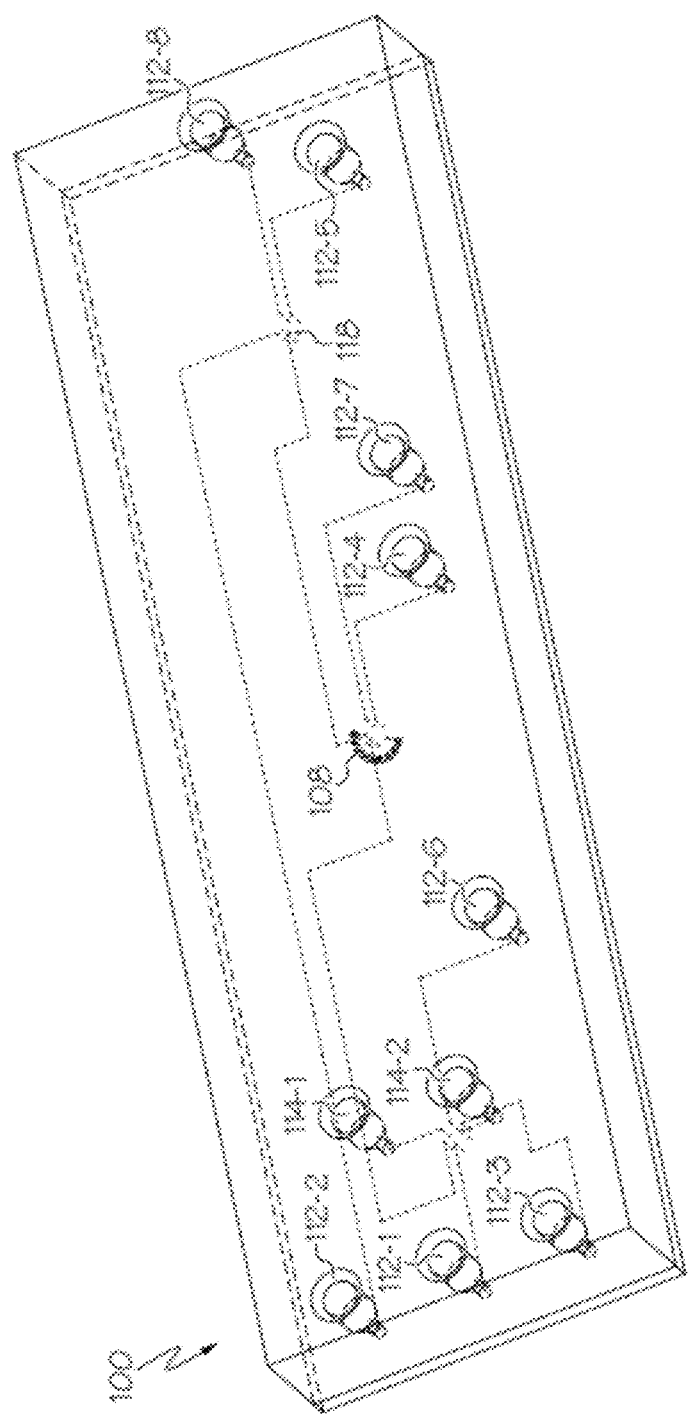
FIG. 5C is a transparent bottom perspective view of the stator body of FIG. 5A.

FIG. 5A is a top view, transparent top view and transparent top perspective view, respectively, of an example of a stator body 100 that can be used as part of a multi-system injector array. The transparent views show the body material as clear so that internal fluid channels and features are apparent. Certain holes 102 and 104 are not shown in FIGS. 5B and 5C to improve the clarity of the remaining features in the figures. FIG. 5D is an expanded view of the central portion of FIG. 5B and shows how internal fluid channels terminate at one of the stator ports 106-1 to 106-6. A fluid channel 108 that couples stator ports 106-3 and 106-6 has a serpentine arc shaped path.

The multi-system injector array can be used to acquire separate volumes of a sample for introduction into multiple chromatography systems. For example, the sample may be acquired from a process line and stored in the separate

TABLE 3

ACQUITY SAMPLE LOOPS

| Sample Loop Size (uL) | Nominal ID (in) | Tolerance + | Tolerance − | Nominal Length (in) | Tolerance + | Tolerance − | Nominal Volume (uL) | Minimum Volume (uL) | Maximum Volume (uL) |
|---|---|---|---|---|---|---|---|---|---|
| 1 | 0.008 | 0.00005 | 0.00005 | 1.22 | 0.001 | 0.001 | 1.0008 | 0.9875 | 1.0142 |
| 2 | 0.008 | 0.00005 | 0.00005 | 2.43 | 0.001 | 0.001 | 2.0016 | 1.9758 | 2.0275 |

The multi-valve array configured with the illustrated stator body 90 can be used as a sampling interface between an extraction system and a chromatographic system to perform an on-line extraction analysis permitting optimization of the extraction process. The array allows a sample to be acquired at one time and stored in different volumes for subsequent injections. As an extraction solvent passes through the multi-valve array, the extractant is sampled by directing it through one or more of the internal sample channels, or the external sample loop, in-line with the chromatographic system. The ability to select different volumes associated with the internal sample channels and any external sample loops can be used to address the amount of analytes in the extraction sample and the dynamic range of the chromatographic detector. More specifically, to quantitate or qualitatively compare analytes extracted from a sample, the signal from the chromatographic detector should be in a linear range of the detector. The multi-valve array can be used to acquire sample into multiple internal sample channels and external sample loops of different volume. This allows an operator to select the sample channel or loop having the appropriate volume to generate a signal in the linear range of the detector. For example, if a prior sample injected from one of the sample channels or loops resulted in an "off scale" detector signal, the sample stored in a smaller volume internal sample channel or external loop can be injected. Alternatively, if the prior sample resulted in too small a detector response, the sample stored in a larger volume internal sample channel or external loop can be injected.

volumes. This allows the sample to be analyzed by different chromatography systems so that multi-attribute information (e.g., information regarding the sample that cannot be obtained by a single chromatography system) can be acquired.

The stator body 100 may be fabricated using a diffusion bonding process such as those described above. The stator body 100 includes bolt holes 102 and alignment pin holes 104 used to attach each of three rotary valve actuators and rotors to a corresponding stator surface. The stator body 100 includes ten external ports. Ports 112-1 and 112-2 are inlet and outlet sample ports, respectively. Ports 112-3, 112-4 and 112-5 are inlet ports for receiving a system flow (mobile phase) from a first chromatography system, a second chromatography system and a third chromatography system, respectively. Ports 112-6, 112-7 and 112-8 are outlet ports for coupling to tubing that provides the system flows to the chromatographic columns of the first, second and third chromatography systems. In alternative embodiments, there may be a different number of inlet and outlet ports according to the number of chromatography systems used for analysis.

The stator body 100 includes a plurality of internal fluid channels that provide advantages similar to those for the above-described embodiments. In general, a single sample is loaded into multiple internal sample channels and/or external sample loops in one continuous sequence. In the illustrated embodiment, the sample can be loaded into three storage volumes: an external sample loop coupled to the stator body 100 at ports 114-1 and 114-2, an internal sample channel 116 formed beneath the stator surface for the center valve, and an internal sample channel 118 formed beneath the right stator surface. Once the sample is stored in the external sample loop, the left rotary valve can be switched to a state in which the sample is injected into the mobile phase of the first chromatography system. Similarly, once the samples are stored in the internal sample channels 108 and 118, the center and right rotary valves can be switched to states in which the samples are injected into the mobile phases of the second and third chromatography systems, respectively.

Figure 6A:
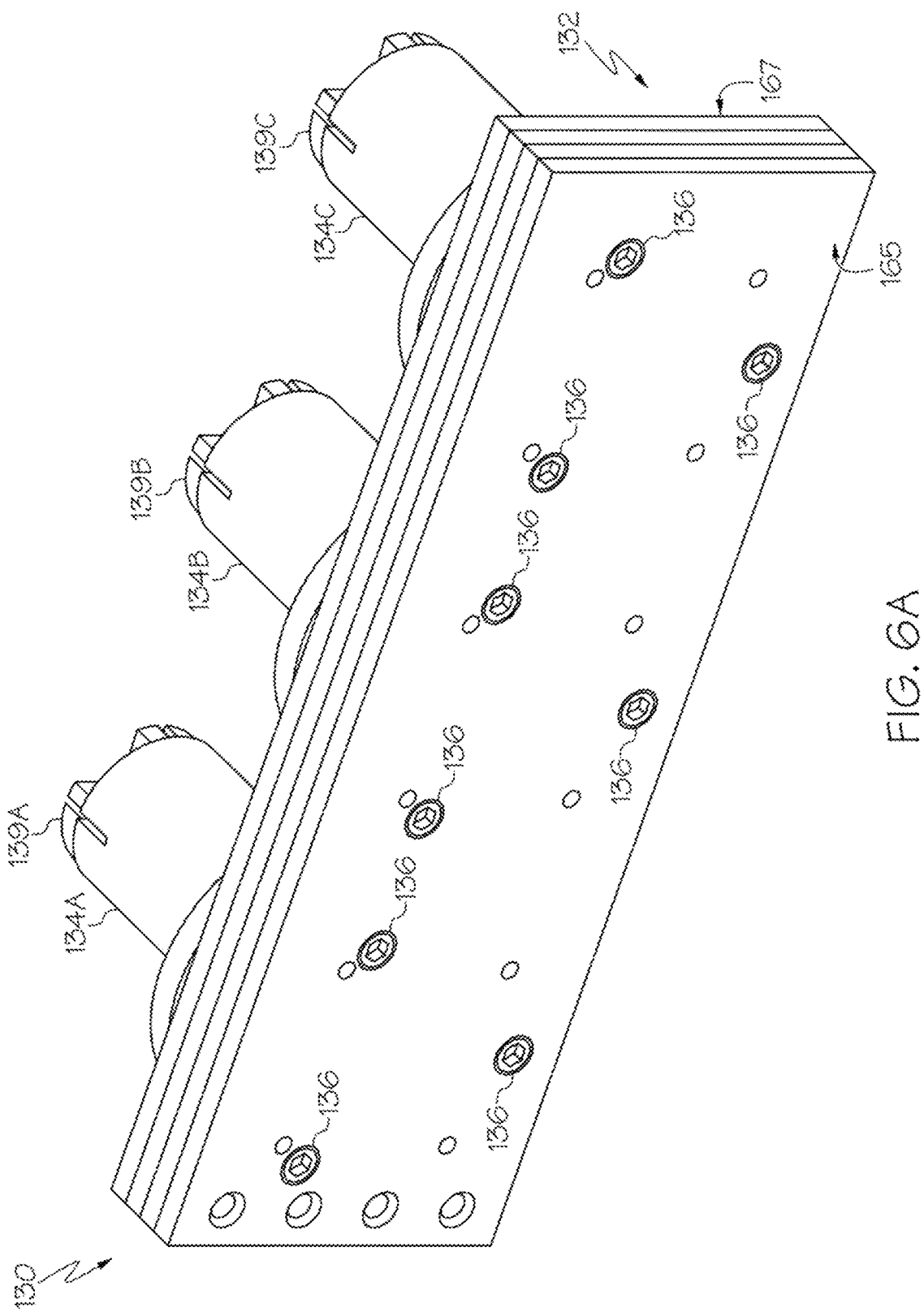
FIG. 6A is a top front perspective view of an example of a multi-valve array.

FIGS. 6A and 6B are a top back view and a top front view, respectively, of an example of a multi-valve array 130 which includes a stator body 132 such as those in the examples described above. The multi-valve array 130 also includes three rotary shear seal valve pods 134 secured to the stator body 132 by bolts 136 which engage threaded holes 137 in a flange 138 on each valve pod 134. In these and subsequent drawings, "A," "B," "C" and "D" used with reference numbers indicate the correspondence of other illustrated components to valve pods 134A, 134B, 134C and 134D, respectively. Internal components of each valve pod 134, such as clover springs, result in a force being applied to maintain each rotor surface against the corresponding stator surface on the stator body 132. A complete rotary shear seal valve includes a pod 132 and a valve drive (not shown). The valve drive has a rotatable drive shaft with features (e.g., alignment pins of different diameter) to engage, in a specific rotational orientation, a top end 139 of the pod 132 which is coupled to a pod shaft that rotates the rotor surface. The valve drive includes a motor and a gearbox mechanically coupled to the drive shaft.

In a conventional rotary shear seal valve, one or more screws or bolts are typically used to secure the valve pod to the valve drive to maintain the valve drive in engagement with the valve pod. In the illustrated example, the stator body 132 does not permit the use of screws or bolts for this purpose because the associated through holes in the stator body 132 could interfere with the internal fluid channels.

Figure 7:
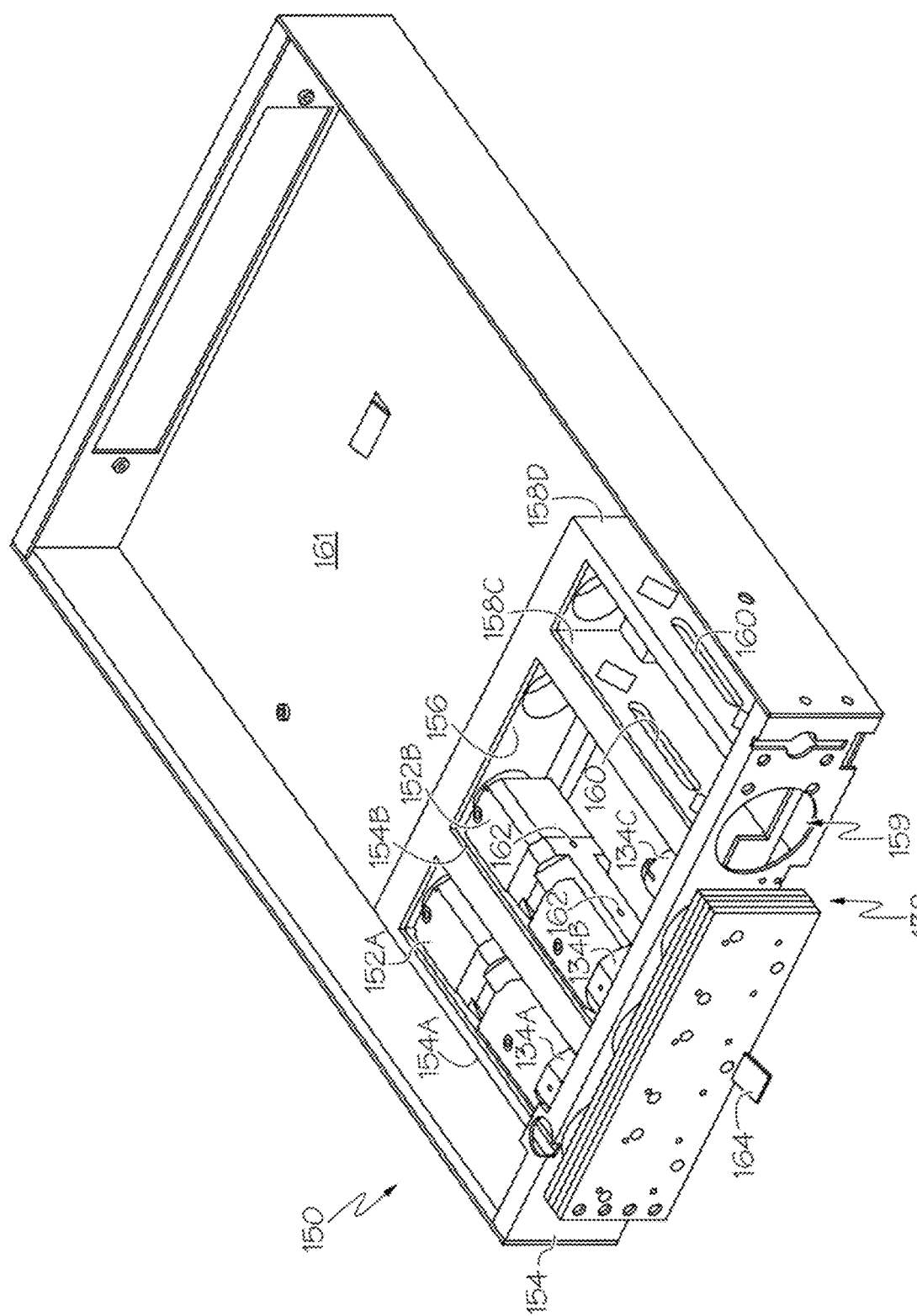
FIG. 7 is a mounting assembly for the multi-valve array of FIGS. 6A and 6B.

FIG. 7 shows a mounting assembly 150 that can be used with the multi-valve array to ensure proper engagement of the valve drives 152 with the valve pods 134. The figure shows only two complete rotary shear seal valves so that various features of the mounting assembly 150 are visible. A third valve pod 134C without a corresponding valve drive is shown attached to the stator body 132 and is visible to the right of the other two valve pods 134A and 134B. Unoccupied space for a fourth rotary shear seal valve that is independent of the stator body 132 is visible to the right of the third valve pod 134C.

The mounting assembly 150 includes a mounting frame having a front wall 154, a back wall 156 opposite to the front wall 154, and four side walls 158. The front wall 154 has four openings 159 (only one unoccupied) each configured to pass a portion of one of the valve pods 134. The side walls 158 extend perpendicularly between the front wall 154 and the back wall 156. Each side wall 158 has a slot 160 that extends along a portion of its length between the front and back walls 154 and 156. In the figure, the back wall 156 and side walls 158 are formed as a single element that is attached to a rack or tray 161 which includes the front wall 154; however, in other examples, the walls 154, 156, 158 may be individual wall structures or may be provided such that two or more walls are integrally formed.

A spring element (not shown) is disposed on or against the inside surface of the back wall 156 in a position opposite to one of the openings in the front wall 154. By way of non-limiting examples, the spring element may be a compression spring or other force-applying deformable element such as a pneumatic, magnetic or electromagnetic element. When one of the valve locations in the mounting assembly 150 is occupied by a valve pod 134 and valve drive 152, the spring element is compressed between the back end of the valve drive 152 and the back wall 156. The spring element urges the valve drive 152 forward, that is, in a direction away from the back wall 156 and toward the front wall 154 which in turn maintains the valve drive 152 in engagement with the respective valve pod 132 and pushes the valve pod 132 forward toward the front wall 154. A pair of guide screws (not shown) extending from threaded holes 162 on one of the sides of a valve drive 152 engages the slot 160 in an adjacent side wall 158. Only one slot 160 is used with each valve drive 152. More specifically, valve drive 152A is used with the slot in side wall 154A although side wall 154B is also adjacent. Valve drive 152B is used with the slot in sidewall 154B, and the slots 160 in side walls 154C and 154D are available for two additional valve drives (not shown). During assembly, each valve drive 152 is substantially restricted by its slot 160 and engaged screws to movement in a direction parallel to the slot length, that is, in a direction parallel to the valve pod axes and valve drive axes. The screws may be shoulder screws. For example, each screw may have an unthreaded portion along a length beneath the screw head where the screw passes through the slot 160 where the unthreaded length is greater that a thickness of the side wall 154. This configuration allows the valve drive 152 to move along a linear path as it engages the valve pod 132. The slot 160 may be dimensioned such that its vertical dimension is greater than a diameter of the unthreaded portion of the screw by an amount that provides a small vertical gap to allow easier engagement of the valve pod 132 to the valve drive 152.

A retainer element 164 is used to secure the stator body 132 against the front (external) surface of the front wall 154 while the spring element is under compression. In some examples, the retainer element 164 is a flexible component that extends away from the front wall 154 and may be pushed downward. When released, the retainer element 164 moves toward its original position.

During assembly, the valve drives 152 are positioned in their proper locations adjacent the side walls 158 and the spring elements. The retainer element 164 is pushed downward to allow the stator body 132 with its attached valve pods 134 to be positioned so that a portion of each valve pod 134 extends through a corresponding opening 159 in the front wall 154 and engages a valve drive 152. The retainer element 164 is then released so that it moves toward its original position and comes in contact with the bottom surface 165 of the stator body 132. The retainer element 164 applies force to the stator body 132 so that its top surface 167 is in contact with the front wall 154 while the spring element forces the valve drive 152 to engage the valve pod 134. In this manner, the stator body 132, valve drives 152 and valve pods 134 are securely held in their proper operating positions.

Figure 8A:
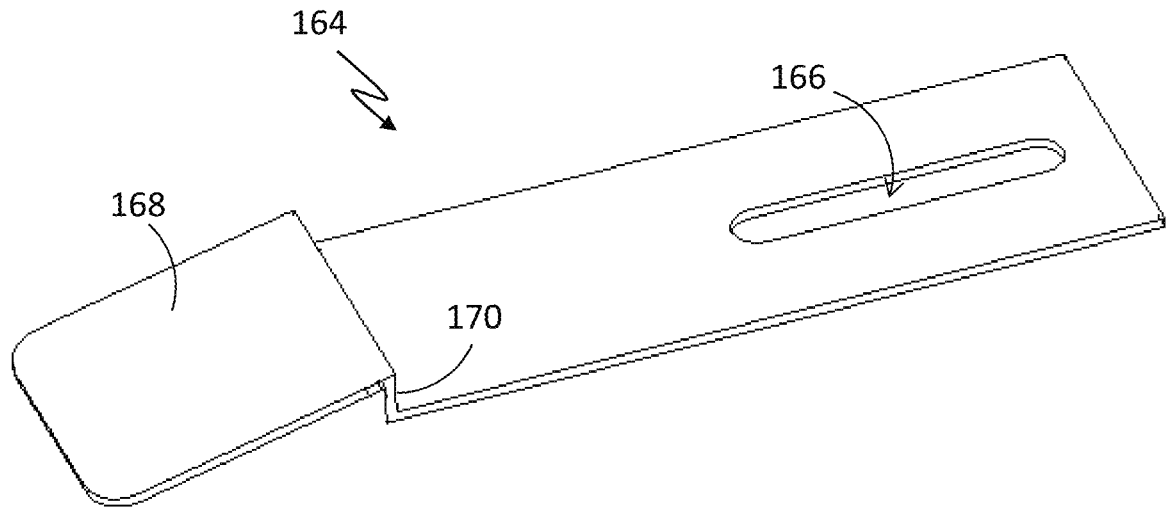
FIG. 8A is a perspective view of an example of a retainer element for the mounting assembly of FIG. 7.
Figure 8B:
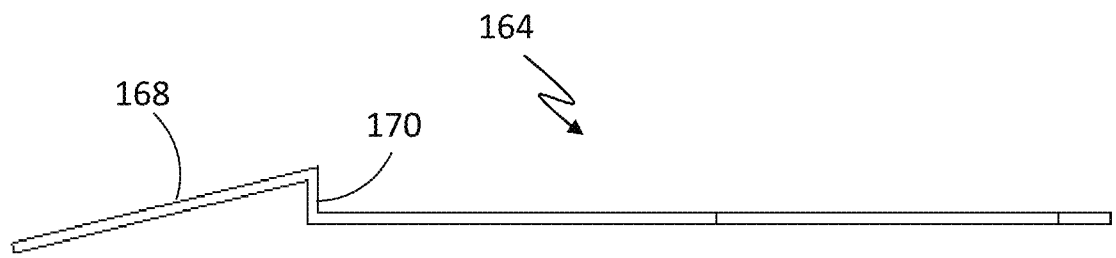
FIG. 8B is a side view of the retainer element of FIG. 8A.
Figure 8C:
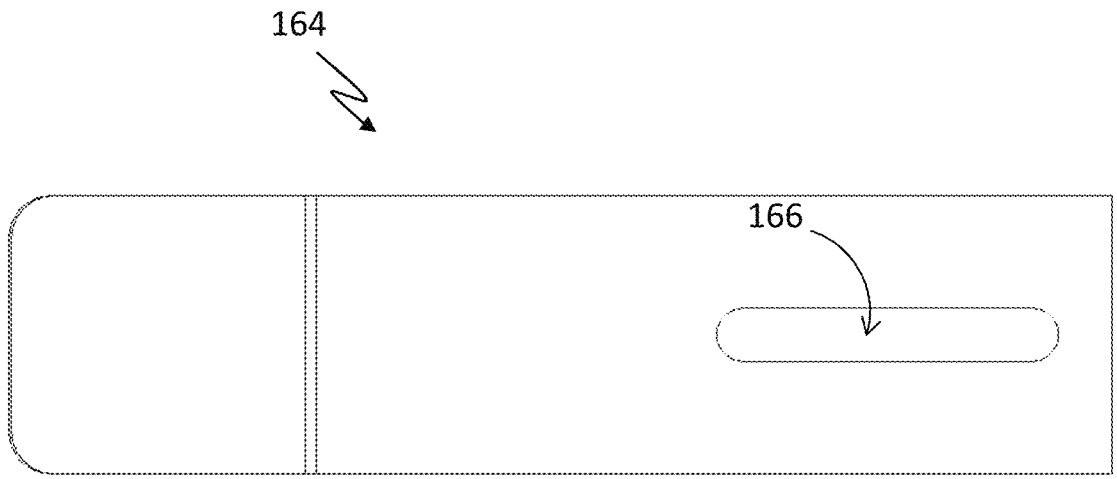
FIG. 8C is a top view of the retainer element of FIG. 8A.

In one example, the retainer element 164 is a sprint clip formed of a resilient material and shown in more detail in the perspective, side and top views provided in FIGS. 8A, 8B and 8C, respectively. The retainer element 164 may be attached to the mounting assembly by two screws. Each screw passes through an elongate opening 166 and engages a threaded hole on the bottom side of the front wall 154. The retainer element 164 is adjusted by sliding in a direction along the length of the opening 166 to a desired position before tightening the bolt. During installation, the front lip 168 is continually depressed downward to allow the stator body 132 to pass and be placed in proper position against the front wall 154. Once in place, the front lip 168 is released so that the retainer element 164 returns to approximately its original shape and an engagement edge 170 comes into contact with and applied force to the front surface of the stator body 132.

In alternative examples, the retainer element can take on any of a wide variety of other forms. The dimensions and shape of the retainer element vary and are determined based on application of a desired force over a contact area. In other examples, two or more retainer elements are used to apply force against the stator body 132 at multiple locations. Other means for applying a holding force to the stator body 132 may be used. For example, one or more toggle clips or friction devices may be used. Alternatively, a deformable material, such as a deformable polymer, may be used.

The examples of mounting assemblies described above accommodate the various examples of stator bodies. Advantageously, the mounting assembly provides a quick and reliable means to secure a stator body so that the attached valve pods properly engage their valve drives without the need for tools or any complicated alignment procedures. Similarly, removal of the stator body with its attached valve pods from the mounting assembly is easily accomplished.

In alternative examples, various types of adaptors may be used with a valve drive and configured for use as described above. For example, a valve drive manufactured for use with a different type of valve pod may be used with an adaptor to engage and properly register with the internal components of the valve pod.

The arrangement of stator surfaces and valve pods is not limited to those described above. In other alternative examples, the multi-valve array may include a stator array that has stator surfaces for only two valve pods or the stator array may have a number of stator surfaces sufficient to allow attachment of four or more valve pods. Moreover, the multi-valve array may be a two-dimensional array. For example, the array can be an arrangement of two or more rows where each row includes two or more valves. Alternatively, the stator body may be configured for other two-dimensional array configurations such as a triangular arrangement of valves.

Referring again to FIGS. 3B and 3C, it can be seen that an individual internal sample channel 82, 84 in the stator body 60 includes an arc-shaped channel segment that extends 180° around its center of curvature and a radial channel segment extending from each end of the arc-shaped channel segment. The radial channel segments are formed at the interface of layers 64-1 and 64-2 with the first end of each radial channel segment coupled through an orthogonal (vertical) channel segment to a corresponding one of the stator surfaces 68 or 70 and the second end of each radial channel segment coupled through a short vertical fluid path to one end of the arc-shaped channel segment. The arc-shaped channel segments are formed at the interface of layers 64-2 and 64-3. Although the full path length of each sample channel 82, 84 is defined by the lengths of the two radial channel segments, the arc-shaped channel segment and the vertical channel segments, the total volume of each sample channel is determined primarily by the length of its arc-shaped channel segment.

All twelve sample channels 82, 84 are intended to have the same volume, for example, 25 µL. Because the length of each arc-shaped channel segment increases with increasing radius of curvature, arc-shaped channel segments with larger radii of curvature have a corresponding greater volume if the depths and widths of the arc-shaped channel segments are the same.

Figure 9A:
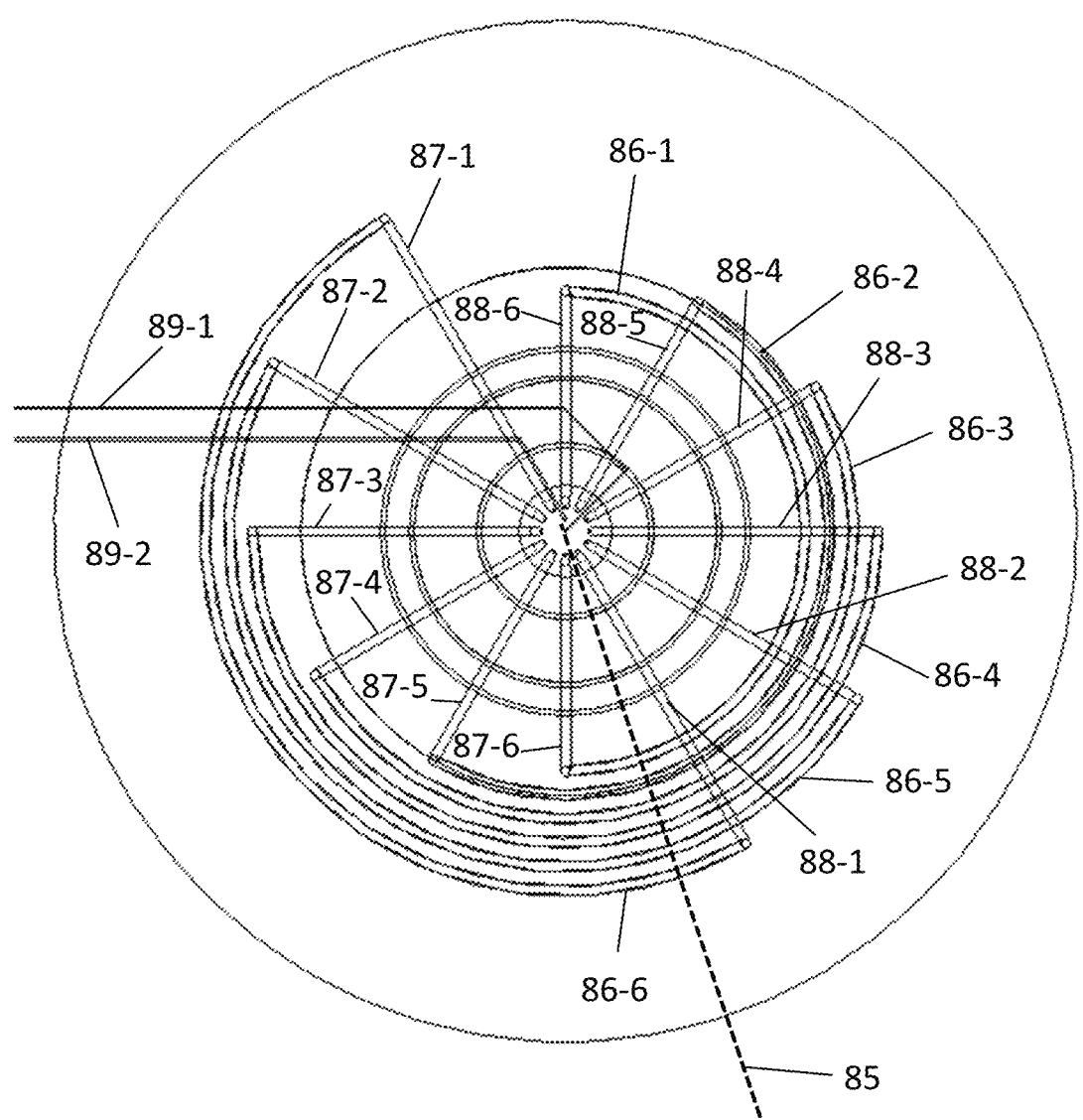
FIG. 9A is a top cross-sectional view of the right-side portion of the stator body of FIG. 3B.
Figure 9B:
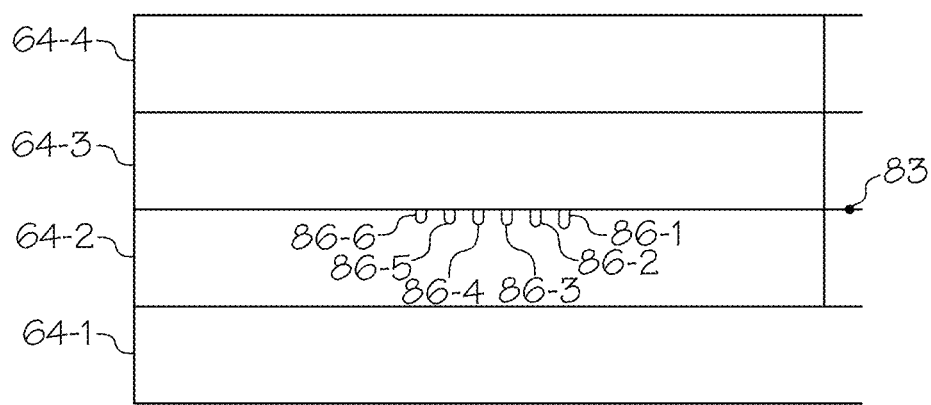
FIG. 9B is a cross-sectional side view of a portion of the stator body shown in FIG. 9A.

FIG. 9A is a top cross-sectional view of the right-side portion of the stator body 60 (FIG. 3B) at the interface of layers 64-1 and 64-2 and FIG. 9B is a cross-sectional side view along the dashed line 85 show in FIG. 9A. Each sample channel 82 includes an arc-shaped channel segment 86 with a radial channel segment 87 or 88 coupling each end of the arc-shaped channel segment 86 to a short vertical channel leading to a respective port on the stator surface. Fluid channels 89-1 and 89-2 conduct solvent and/or sample to or from a sample channel 82. The particular sample channel 82 coupled to the fluid channels 89 is determined by the valve state of the rotary valve.

The depth of each arc-shaped channel segment 86 below an external surface of the device is different from the depths of the other arc-shaped channel segments 86. The channel segment 86-1 with the smallest radius of curvature, defined as its distance from the center of curvature 83, has the greatest depth with each channel segment 86 of greater radius of curvature having a decreased depth such that the channel segment 86-6 having the greatest radius of curvature has the least depth. The depth is used as a controlled manufacturing variable to ensure that all arc-shaped channel segments 82 have the same segment volume.

One disadvantage of the varying depth of the arc-shaped channel segments 86 is that each channel segment 86 has a different flow characteristic. Generally, long channels having smaller diameters have lower dispersion as compared to shorter channels with larger diameters. Due to the different lengths and depths of the channel segments 86, the dispersion for each channel is generally different. Such differences lead to variations in chromatographic measurements based on which sample channel 82 is utilized.

Figure 10A:
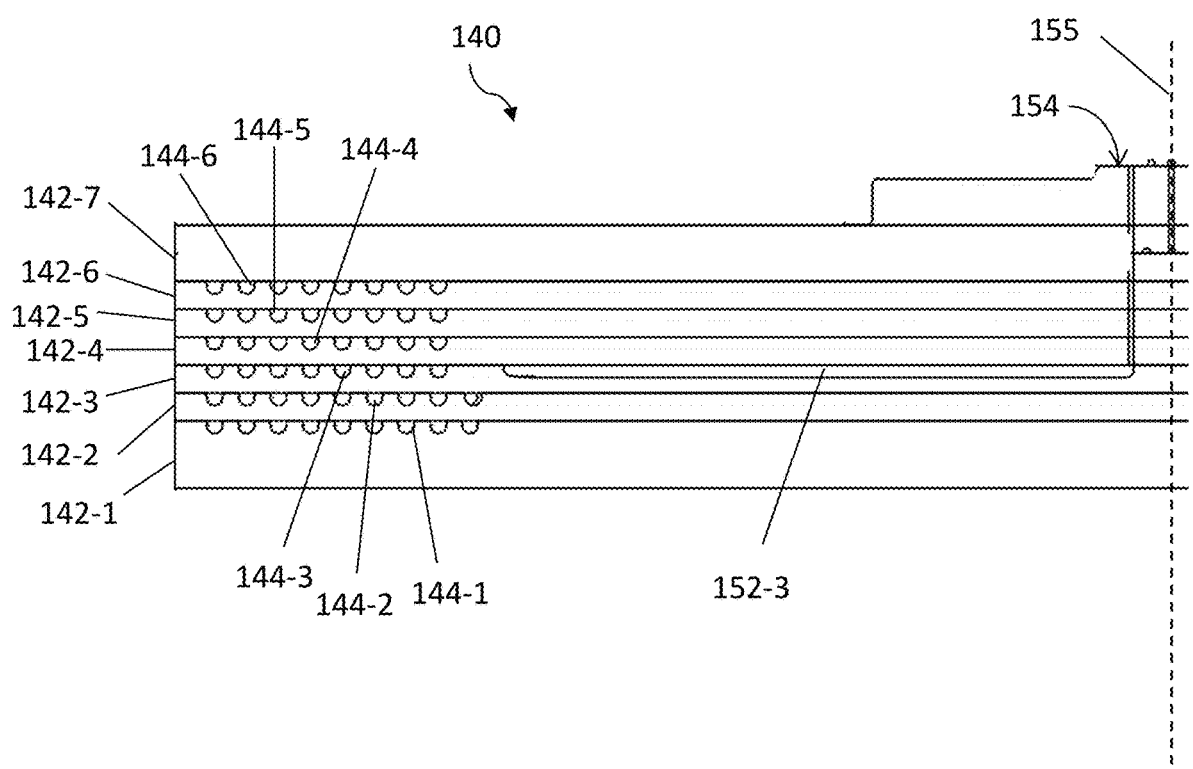
FIG. 10A is a cross-sectional side view of a portion of another embodiment of a stator body.

FIG. 10A is a cross-sectional side view of a portion of a multi-channel fluidic device in the form of an alternative to the stator body 60 of FIGS. 3A to 3C. The illustrated stator body 140 is formed from a plurality of layers 142 into a single body. Seven layers 142-1 to 142-7 are diffusion bonded together to create the single body having multiple sample channels 144. Additional layers (not shown) may be provided and may include openings to accept external fittings and to provide features such as attachment features to facilitate attachment of the rotary valves. The layers 142 are parallel to each other and to one or more external device surfaces.

Figure 10B:
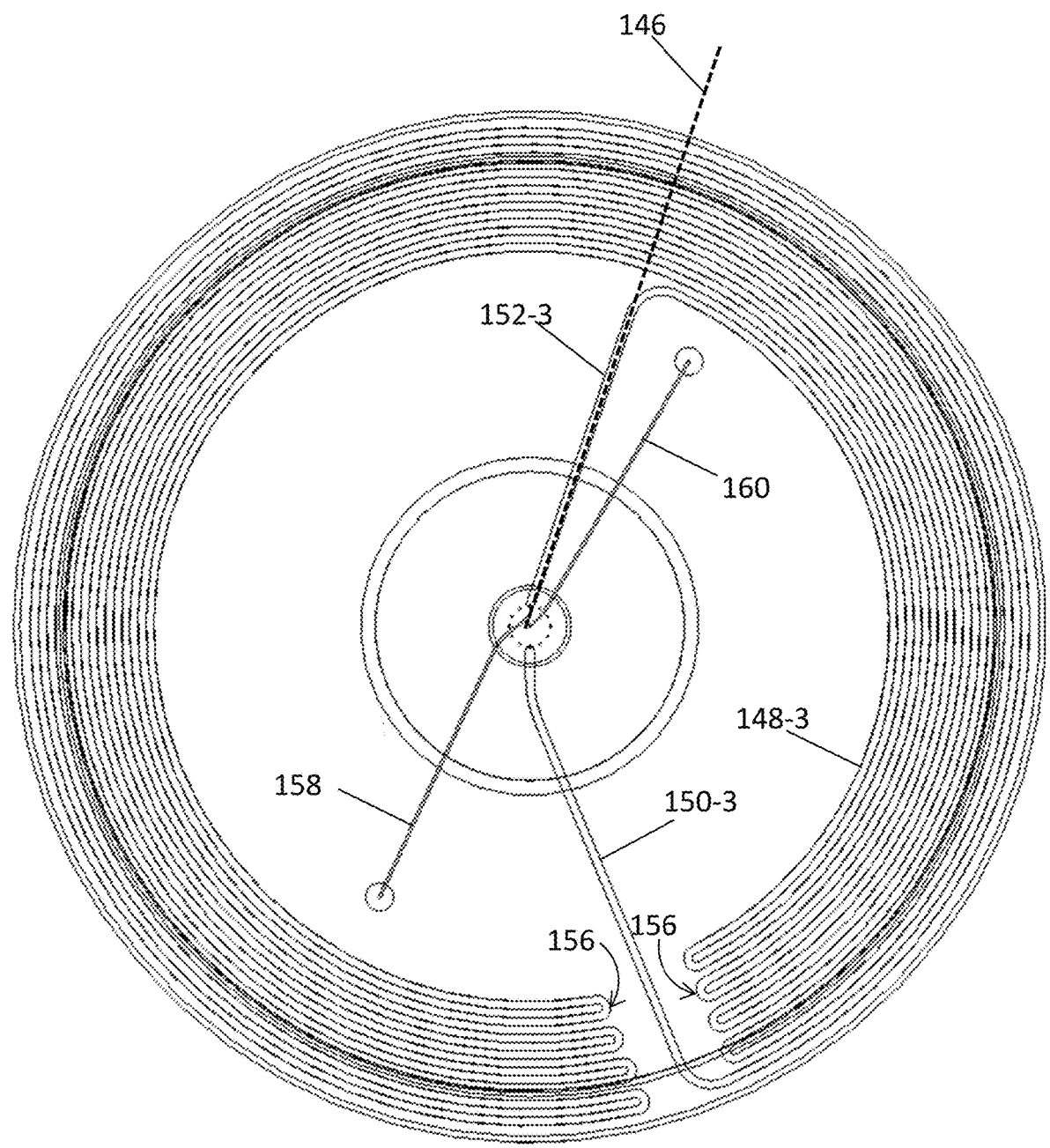
FIG. 10B is a top cross-sectional view of a larger portion of the stator body of FIG. 10A.

Each sample channel 144 is disposed at a unique interface of two of the layers 142. For example, sample channel 144-3 is formed at the interface of layers 142-3 and 142-4. Although the reference numbers 144-$n$ (where n identifies a particular sample channel) are associated with lines directed to a single opening, it will be appreciated that all the openings at that interface are part of the same sample channel. The interfaces are parallel to each other and to the external surfaces of the stator body 60. FIG. 10B shows a top cross-sectional view at the interface of layers 142-3 and 142-4 of a larger portion of the stator body 140 where the dashed line 146 indicates the location of the cross-sectional view of FIG. 10A. Thus, FIG. 10B shows only a single sample channel 144-3.

Each sample channel 144 includes a hybrid serpentine arc (HAS)-shaped segment 148 with a radial channel segment 150 coupling one end of the HAS-shaped segment 148 to a vertical channel segment that extends to a port on the stator surface 154. A second radial channel segment 152 couples the other end of the HAS-shaped segment 148 to another port on the stator surface 154 through another vertical channel segment. Each HAS-shaped segment 148 has the same shape but is oriented at a different angular position with respect to a rotation about an axis 155. For example, the angular positions may be separated equally in angle by 60°. The illustrated HAS-shaped segment 148-3 is defined by a series of circumferential paths of less than 360° where, other than the innermost and outmost circumferential paths, each circumferential path is coupled to an adjacent path by a turning section 156. Each circumferential path is defined by a radius of curvature that is different than the radii of curvature of the other circumferential paths. This geometrical arrangement of the HAS-shaped segment 148-3 allows for a significant volume of sample to be stored. For example, the sample channels 144 may each have a volume of 250 µL.

An additional advantage to placing channels on individual layers is the ability to have different channel segment volumes without changing the channel segment geometries. In one non-limiting example, a single layer defines a 250 µL channel segment and the device contains six layers. Therefore, six different volumes of 250 µL each can be accessed at 30° rotations of the rotor. Pairs of layers can be serially connected internally to form three connected channel segments each containing a total of 500 µL which can be accessed at 60° rotations of the rotor. Three layers can be combined to form two connected channel segments each containing a total of 750 µL. In other configurations, four layers can be combined into a single connected group of channel segments containing a total of 1,000 five layers can be combined into a single connected group of channel segments containing a total of 1,250 and six layers can be combined into a single 1,500 µL connected group of channel segments. Thus, with minimal changes to the interconnect geometry, the valve can support configuration flexibility.

The sample channel 144-3 may be coupled to other regions (e.g., features or ports) of the stator body 140 through fluid channels 158 and 160 when the rotary valve is in a particular valve state. Other sample channels 144 present at the interface of other layers 142 may be coupled through fluid channels 158 and 160 by reconfiguring the valve state of the rotary valve.

Advantageously, by providing each HAS-shaped channel segment 148 at a different layer interface in the stator body 140, the volumes of the sample channels 144 can be made nearly identical. The differences in the volumes of the vertical channel segments for each sample channel may lead to a small variation in the sample channel volumes; however, these differences can be on the order of 0.1% or less.

Sample channel path geometries other than those described above are contemplated. For example, the HAS-shaped channel segments 148 may be replaced with a differently shaped channel segment as long as the shape avoids interference between the channel segments that extend out of the plane of the interfaces of the layers and so that the volumes of the sample channels are substantially similar. In this context, substantial similarity of volumes means that the usefulness of a chromatographic measurement made with the device is unaffected by which sample channel is employed for the measurement.

In various embodiments described above, the volumes of the sample channels are nearly identical; however, other stator bodies may be fabricated with sample channels of different volumes. For example, a stator body having different sample channel volumes can be used with an autosampler to permit selection of any one or more of the sample channels for storage and sample injection of different volumes of sample. Each channel segment may be formed to have a volume that is different from the volume of the other channel segments regardless of whether the channel segments are formed at a single interface of layers (FIGS. 3B and 3C) or at different interfaces (FIG. 10A). Different volumes may be achieved in fabrication by using differences in one or more of the channel segment lengths, widths, depths, and shapes.

A wide range of sample volumes is possible regardless of whether the volumes of the sample channels are the same or different. For example, sample channel volumes as small as 10 nL or less can be used. In other embodiments, the volumes may be 2 mL or greater. For example, larger volumes may be achieved with larger layer thickness which allows for greater channel depths.

While the invention has been shown and described with reference to specific embodiments, it should be understood by those skilled in the art that various changes in form and detail may be made therein without departing from the scope of the invention as recited in the accompanying claims. For example, various embodiments described above relate to a stator body; however, other multi-channel fluidic devices structured according to the principles described herein are contemplated.

What is claimed is:

1. A multi-channel fluidic device, comprising:
   a diffusion-bonded body having a device surface, a stator surface and a plurality of fluid channels, each of the fluid channels comprising a channel segment defined in a plane that is parallel to the device surface and parallel to each of the planes of the other channel segments, wherein:
   the plane of each channel segment is at a depth below the device surface that is different from the depth below the device surface for each of the other channel segments, each of the fluid channels further comprising:
   a first orthogonal channel segment and a second orthogonal channel segment coupling a first end and a second end, respectively, of the channel segment to the stator surface, wherein:
   each of the channel segments has a volume that is equal to the volume of each of the other channel segments for storage of a plurality of equal volumes of a sample; and wherein:
   a first channel segment includes a first radial channel segment that is at a first depth and the second channel segment includes a second radial channel segment that is at a second depth greater than the first depth and the first radial channel segment at the first depth has a greater radius of curvature than a radius of curvature of the second radial channel segment at the second depth.

2. The multi-channel fluidic device of claim 1 wherein each of the channel segments has a shape defined in the plane of the channel segment that is the same as the shape of each of the other channel segments.

3. The multi-channel fluidic device of claim 2 wherein the shape is an arc.

4. The multi-channel fluidic device of claim 2 wherein the shape comprises a serpentine path.

5. The multi-channel fluidic device of claim 2 wherein the shape comprises a hybrid serpentine arc defined by a series of circumferential paths of less than 360° where, other than an innermost and outmost circumferential path, each circumferential path is coupled to an adjacent path by a turning section and, wherein, each circumferential path is defined by a radius of curvature that is different than the radii of curvature of the other circumferential paths.

6. The multi-channel fluidic device of claim 1 wherein each of the channel segments has a shape defined in the plane of the channel segment that is different from the shape of each of the other channel segments.

7. The multi-channel fluidic device of claim 1 wherein each channel segment is arranged at an angular orientation within the plane and in respect to a center point that is different from the angular orientation of each of the other channel segments.

8. The multi-channel fluidic device of claim 1, wherein each of the channel segments has a volume in a range between about 10 nL and about 2 mL.

9. The multi-channel fluidic device of claim 1, further comprising a rotor in communication with the stator surface.

10. The multi-channel fluidic device of claim 9, wherein the rotor is configurable to couple the second orthogonal channel segment of one of the channel segments to a first orthogonal channel segment of another one of the channel segments.

11. The multi-channel fluidic device of claim 1, wherein the first or second radial channel segment has a first end coupled through one of the first orthogonal channel segment and the second orthogonal channel segment to the stator surface and a second end coupled to one of the plurality of channel segments.

\* \* \* \* \*